United States Patent
Nagai

(10) Patent No.: US 11,467,280 B2
(45) Date of Patent: Oct. 11, 2022

(54) UNDERWATER DETECTION APPARATUS AND UNDERWATER DETECTION METHOD

(71) Applicant: FURUNO ELECTRIC CO., LTD., Nishinomiya (JP)

(72) Inventor: Sanae Nagai, Nishinomiya (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 149 days.

(21) Appl. No.: 16/588,911

(22) Filed: Sep. 30, 2019

(65) Prior Publication Data

US 2020/0116858 A1   Apr. 16, 2020

(30) Foreign Application Priority Data

Oct. 11, 2018  (JP) .............................. JP2018-192382

(51) Int. Cl.
    *G01S 15/06* (2006.01)
    *G01S 15/96* (2006.01)
    *G06T 17/05* (2011.01)

(52) U.S. Cl.
    CPC .............. *G01S 15/06* (2013.01); *G01S 15/96* (2013.01); *G06T 17/05* (2013.01)

(58) Field of Classification Search
    CPC .......... G01S 15/06; G01S 15/96; G06T 17/05
    See application file for complete search history.

(56) References Cited

U.S. PATENT DOCUMENTS

| | | | |
|---|---|---|---|
| 8,876,717 B2 * | 11/2014 | Tokita ................... | A61B 5/0091 600/443 |
| 2013/0148471 A1 * | 6/2013 | Brown .................... | G01S 7/629 367/88 |

FOREIGN PATENT DOCUMENTS

| | | | | |
|---|---|---|---|---|
| EP | 2963443 A1 | * | 1/2016 | ............ G01S 15/06 |
| JP | H0943350 A | * | 2/1997 | |
| JP | H0943350 A | * | 2/1997 | |

OTHER PUBLICATIONS

EchoPilot Marine Electronics Ltd.; "Echopilot 3D Forward Looking Sonar"; Echopilot; The Sonar People; as of Jul. 6, 2017; 2 pages; England.

FarSounder, Inc.; Forward Looking Navigation Sonars FarSounder-500 / FarSounder-1000 Series; Far Sounder 2014; 4 pages; USA.

(Continued)

*Primary Examiner* — Isam A Alsomiri
*Assistant Examiner* — Abdallah Abulaban
(74) *Attorney, Agent, or Firm* — Studebaker & Brackett PC

(57) ABSTRACT

An underwater detection apparatus is provided. The apparatus may include a transmission transducer, a reception transducer, and processing circuitry. The transmission transducer may transmit a transmission wave. The reception transducer may include a plurality of reception elements that generate a reception signal based on a reflection wave including a reflection of the transmission wave on an underwater target. The processing circuitry may generate a 3D image data that represents an echo intensity of the underwater target based at least in part on the reception signal generated by each reception element, and may set a depth marking on the 3D image data for which a depth is equal to a given depth, by changing an echo intensity color that represents the echo intensity of the 3D image data into a depth color that represents a depth of the 3D image data, the depth color being different from the echo intensity color.

14 Claims, 14 Drawing Sheets

3D IMAGE AFTER BOUNDARY PROCESSING WHERE EQUI-DEPTH CONTOUR IS DISPLAYED

(56) References Cited

OTHER PUBLICATIONS

Furuno Electric Co., Ltd.; Furuno Operator's Manual; 6" Echo Sounder Model LS-6100; Dec. 21, 2011; 52 pages; Japan.
Lowrance; StructureScan 3D User Guide; as of Jul. 6, 2017; 16 pages.
WASSP Ltd.; WASSP Multibeam Operator Manual, WMB-3230, WMB-5230; Doc. P/N: WSP-009-008; Version V14; Aug. 2014; New Zealand.
YouTube Video; Lowrance; 3D Sonar Fishfinder with StructureScan 3D from Lowrance; https://www.youtube.com/watch?v=0M3L3xfJgso&feature=youtu.be; youtube.com; as of Jul. 6, 2017.
Video; FarSounder Inc; Passing a Very Shallow Rock Outcropping; http://www.farsounder.com/vef/load/fb3b1a954fffabc23672af081778c658?width=640px&height=365; as of Jul. 6, 2017.

* cited by examiner

UNDERWATER DETECTION APPARATUS AND UNDERWATER DETECTION METHOD

CROSS-REFERENCE TO RELATED APPLICATION(S)

This application claims priority under 35 U.S.C. § 119 to Japanese Patent Application No. 2018-192382, which was filed on Oct. 11, 2018, the entire disclosure of which is hereby incorporated by reference.

TECHNICAL FIELD

The present disclosure relates to an underwater detection apparatus and an underwater detection method, which detect an underwater object.

BACKGROUND

Three-dimensional (3D) sonar is known as an underwater detection apparatus, for example, as disclosed in "ECHO PILOT FLS 3D FORWARD LOOKING SONAR PRODUCT Brochure," Page 2, [online], ECHO PILOT, [searched on Apr. 20, 2018], Internet <URL: https://echopilot.com/wp-content/uploads/2017/10/Brochure_FLS_3D_FLS3D-B01Issue01_D0561_18102017.pdf>. The 3D sonar transmits a beam from a transmitter element and receives an echo by a receiver element. By processing the reception signal acquired by receiving the echo, 3D image data indicative of an echo intensity of an underwater target object is generated, and a 3D echo image is displayed on a display screen based on the 3D image data. Note that, the 3D sonar indicates grid lines indicative of a depth of a seabed in the 3D echo image.

However, in the above configuration, the grid lines in the 3D echo image only indicates water depths. Therefore, in the 3D echo image, it is difficult to visually grasp a water depth of the underwater target object, such as a school of fish. For example, by a user performing a mouse operation to rotate the 3D echo image in a display screen, it may become easier to visually recognize the water depth of the underwater target object. However, since the user's operation of rotating the 3D echo image is troublesome for the user, it is difficult to expect the user to perform frequent image rotating operations.

SUMMARY

The present disclosure is made in view of solving the above problem, and it is to provide an underwater detection apparatus and an underwater detection method which enable a user to visually grasp a water depth of an underwater target object more easily in a 3D echo image.

In order to solve the problem described above, an underwater detection apparatus according to one aspect of the present disclosure may include a transmission transducer, a reception transducer, and processing circuitry. The transmission transducer may transmit a transmission wave. The reception transducer may include a plurality of reception elements that generate a reception signal based on a reflection wave including a reflection of the transmission wave on an underwater target. The processing circuitry may generate a 3 dimensional image data that represents an echo intensity of the underwater target based at least in part on the reception signal generated by each reception element, and may set a depth marking on the 3 dimensional image data for which a depth is equal to a given depth, by changing an echo intensity color that represents the echo intensity of the 3 dimensional image data into a depth color that represents a depth of the 3 dimensional image data, the depth color being different from the echo intensity color.

The processing circuitry may generate the 3 dimensional image data by performing isosurface processing, may set the marking on the 3 dimensional image data when the echo intensity of the 3 dimensional image data is a given echo intensity, less than a maximum echo intensity of the 3 dimensional image data, and when the 3 dimensional image data includes a plurality of different echo intensity parts, the processing circuitry may set the marking on only one echo intensity part of the plurality of different echo intensity parts.

In order to solve the problem described above, an underwater detection method according to one aspect of the present disclosure may include transmitting a transmission wave, generating a reception signal based on a reflection wave including a reflection of the transmission wave on an underwater target, by using a plurality of reception elements, generating a 3 dimensional image data that represents an echo intensity of the underwater target based at least in part on the reception signal generated by each reception element, and setting a depth marking on the 3 dimensional image data for which a depth is equal to a given depth, by changing an echo intensity color that represents the echo intensity of the 3 dimensional image data into a depth color that represents a depth of the 3 dimensional image data, the depth color being different from the echo intensity color.

According to the present disclosure, a user can visually grasp the water depth of an underwater target object more easily in a 3D echo image.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Hereinafter, an underwater detection apparatus 1 and an underwater detection method according to one embodiment of the present disclosure will be described with reference to the accompanying drawings.

[Configuration of Underwater Detection Apparatus]

Figure 1:
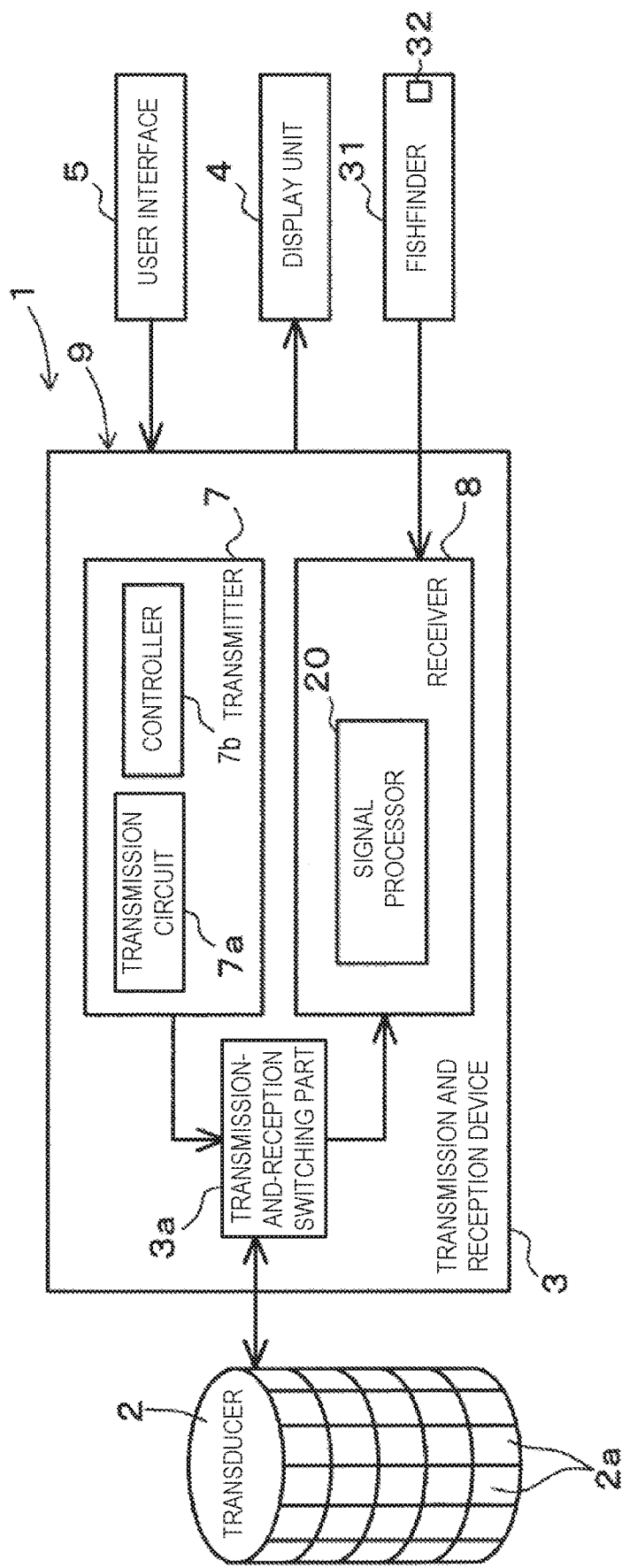
FIG. 1 is a block diagram illustrating a configuration of an underwater detection apparatus according to one embodiment of the present disclosure.
Figure 2:
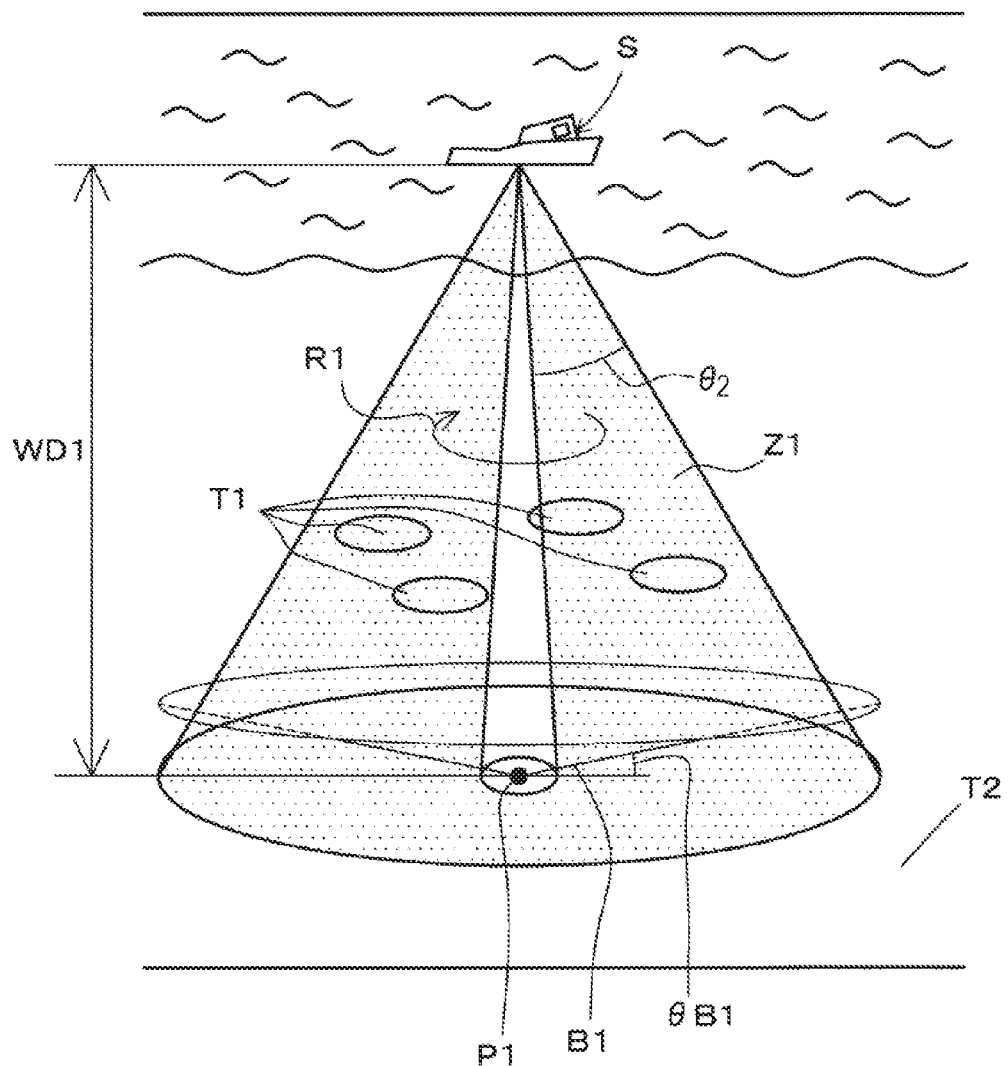
FIG. 2 is a view schematically illustrating a transmitting range of a transmission wave transmitted from a transducer.

FIG. 1 is a block diagram illustrating a configuration of an underwater detection apparatus 1 according to one embodiment of the present disclosure. FIG. 2 is a view schematically illustrating a transmitting range of a transmission wave transmitted from a transducer 2. Referring to FIGS. 1 and 2, the underwater detection apparatus 1 of this embodiment is mounted on a ship S, such as a fishing boat, for example. Below, the ship S provided with the underwater detection apparatus 1 may be referred to as "the ship S" in order to distinguish from other ships. Note that, in FIG. 1, only some of components provided to a receiver 8 are illustrated.

The underwater detection apparatus 1 according to this embodiment may be a scanning sonar. The underwater detection apparatus 1 according to this embodiment may generate an image on which an underwater target object included in a three-dimensional (3D) area Z1 is projected, the three-dimensional (3D) area Z1 being a 3D transmission wave area near the ship S. The underwater detection apparatus 1 may generate the 3D image and its side image on which the underwater target object included in the 3D area Z1 near the ship S may be projected by performing operation which will be described below.

The underwater detection apparatus 1 may include the transducer 2 (which may also be referred to as a "transmission transducer" or a "reception transducer"), a transmission and reception device 3 (which may also be referred to as a "transmission and reception circuit"), a display unit 4, and a user interface 5.

The transducer 2 may have a function to transmit and receive an ultrasonic wave, and may be attached to the bottom of the ship. The transducer 2 may have a substantially cylindrical shape, and may be disposed so that its axial direction is oriented along the up-and-down direction and its radial direction is oriented along the horizontal direction.

In detail, the transducer 2 may have a substantially cylindrical casing, and ultrasonic transducers as a plurality of transceiver elements 2a (which may also be referred to as transmission elements and/or reception elements) attached to an outer circumferential surface of the casing. The ultrasonic transducers may transmit an ultrasonic wave underwater, receive an echo, convert the echo into an electrical signal (reception signal), and output it to the receiver 8. Note that, in this embodiment, although the transducer 2 has the cylindrical shape, the shape may not be particularly limited to this shape and may be other shapes such as a spherical shape.

In FIG. 2, a transmitting range of the transmission wave transmitted from the transducer 2 mounted on the ship S is schematically illustrated by a dot-hatched part.

In this embodiment, the transmission wave as illustrated in FIG. 2 may be transmitted from the transducer 2. The transducer 2 may transmit the transmission wave to all the horizontal directions centering on the ship S. A beam width $\theta_2$ of the transmission wave is, for example, several tens of degrees.

The transducer 2 may be driven by the transmission and reception device 3 to transmit the transmission wave, and may generate a reception signal based on a reflection wave including a reflection of the transmission wave from the underwater target object, such as a school of fish T1 or a seabed T2.

The transmission and reception device 3 may include a transmission-and-reception switching part 3a, a transmitter 7, and the receiver 8 (which may also be referred to as "processing circuitry").

Figure 3:
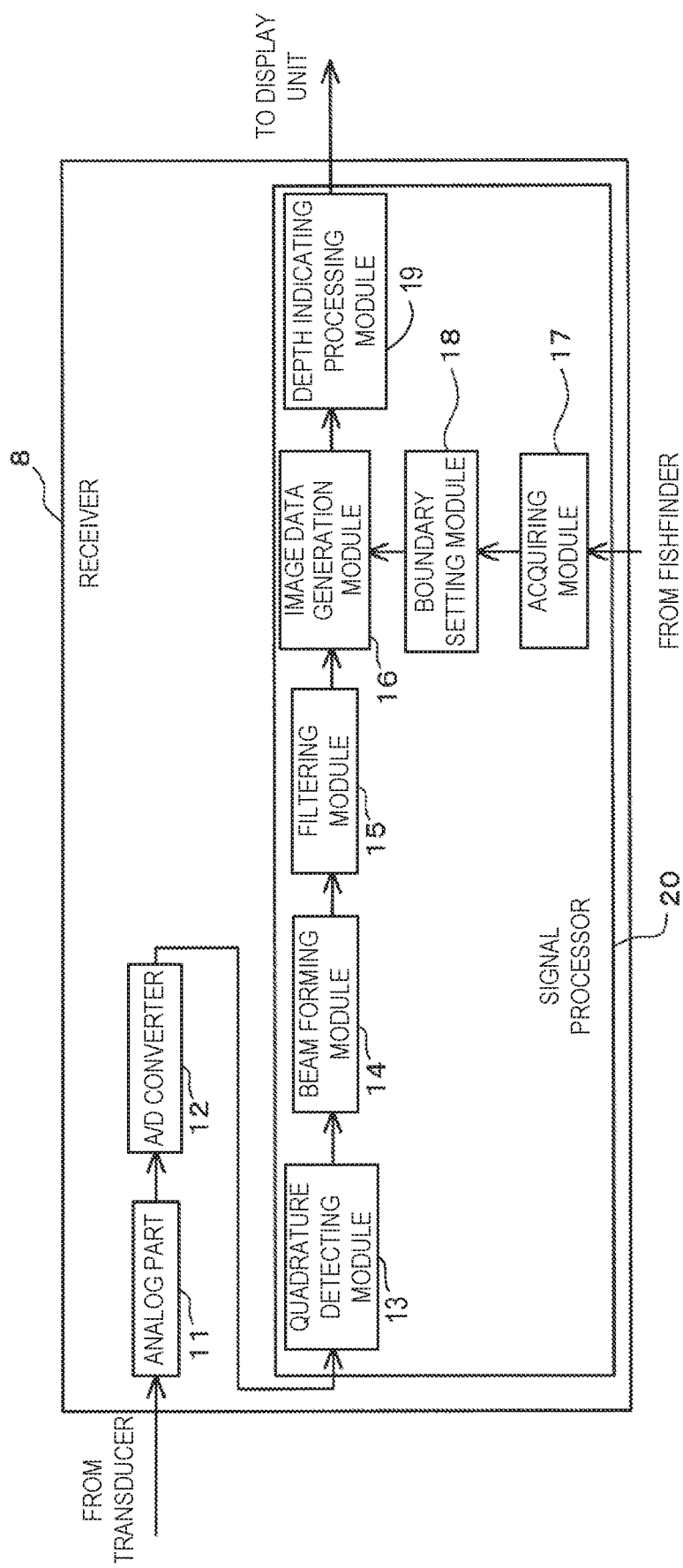
FIG. 3 is a block diagram illustrating a configuration of a receiver.

FIG. 3 is a block diagram illustrating a configuration of the receiver 8. Referring to FIGS. 1 to 3, the transmission and reception device 3 may be comprised of devices, such as a hardware processor 9 (for example, a CPU, a FPGA, etc.), an analog circuitry, and a nonvolatile memory. The hardware processor 9 may function as a controller 7b described in detail below, a quadrature detecting module 13, a beam forming module 14, a filtering module 15, an image data generation module 16, an acquiring module 17, a boundary setting module 18, and a depth indicating processing module 19. For example, by the CPU reading a program from the nonvolatile memory and executing the program, the hardware processor 9 functions as the controller 7b, the quadrature detecting module 13, the beam forming module 14, the filtering module 15, the image data generation module 16, the acquiring module 17, the boundary setting module 18, and the depth indicating processing module 19. The controller 7b, the quadrature detecting module 13, the beam forming module 14, the filtering module 15, the image data generation module 16, the acquiring module 17, the boundary setting module 18, and the depth indicating processing module 19 may be included in the signal processor 20.

The transmission-and-reception switching part 3a may switch the transmission and the reception of a signal to/from the transducer 2. In detail, when transmitting to the transducer 2 a drive signal for causing the transducer 2 to be driven, the transmission-and-reception switching part 3a may output to the transducer 2 the drive signal outputted from the transmitter 7. On the other hand, when receiving the reception signal from the transducer 2, the transmission-and-reception switching part 3a may output the reception signal received by the transducer 2 to the receiver 8.

The transmitter 7 may generate a drive signal used as the basis of the transmission wave to be transmitted from the transducer 2. The transmitter 7 may include a transmission circuit 7a and the controller 7b.

The transmission circuit 7a may generate a drive signal under the control of the controller 7b. In detail, the transmission circuit 7a may have a transmission circuit (not illustrated) provided corresponding to each ultrasonic transducer 2a, and each transmission circuit may generate the drive signal by being suitably controlled by the controller 7b. The drive signal may be a signal used as the basis of the transmission wave to be transmitted from the transducer 2.

The controller 7b may cause the transmission circuit 7a to generate the drive signal by suitably controlling each of the plurality of transmission circuits provided to the transmission circuit 7a. For example, if the shape of the transducer 2 is the cylindrical shape, the controller 7b controls the amplitude and the phase of the drive signal so that a function of a shading coefficient in the up-and-down direction becomes a sinc function.

The receiver 8 may include an analog part 11, an A/D converter 12, the quadrature detecting module 13, the beam forming module 14, the filtering module 15, the image data generation module 16, the acquiring module 17, the boundary setting module 18, and the depth indicating processing module 19. The analog part 11 and the A/D converter 12 may be provided as a reception circuit which processes the reception signal generated based on the reflection wave of the transmission wave.

The analog part 11 may amplify the reception signal as the electrical signal from the transducer 2 and remove an unnecessary frequency component by limiting its frequency band. The analog part 11 may process the reception signal as the electrical signal generated from the reflection wave of the transmission wave.

The A/D converter 12 may convert the reception signal as the electrical signal processed by the analog part 11 into a reception signal as a digital signal. That is, the A/D converter 12 may process the reception signal as the electrical signal generated based on the reflection wave of the transmission wave to convert it into the reception signal as the digital signal.

The quadrature detecting module 13 may apply a quadrature detection to the reception signal which is generated by each ultrasonic transducer 2a and processed by the analog part 11 and the A/D converter 12 to generate an I-signal and a Q-signal. These signals may be processed as a complex signal which uses the I-signal as a real part and uses the Q-signal as an imaginary part. The quadrature detecting module 13 may output the generated complex signal to the beam forming module 14.

The complex signal from the quadrature detecting module 13 of the receiver 8 may be inputted into the beam forming module 14. The beam forming module 14 may perform a beam forming (in detail, summing phase shifted signals or adaptive beam forming) to the complex signal obtained from particular transducers among the plurality of ultrasonic transducers 2a (at least some of the ultrasonic transducers 2a). Therefore, the beam forming module 14 may generate a reception beam signal which is a signal equivalent to what is obtained by a single ultrasonic transducer having a sharp directivity in a particular direction. In this embodiment, an area in which the beam signal is formed may be referred to as a "reception beam area." The beam forming module 14 may generate a large number of reception beam signals having directivities in all directions by repeating the processes, while changing a combination of the ultrasonic transducers 2a used for the beam forming. The beam forming module 14 may scan the range to which the transmission waves are transmitted by generating the reception beam signal having a beam width narrower than a beam width $\theta_2$ of the transmission wave, and gradually changing its tilt angle. Note that positional information on each 3D data (will be described later in detail) generated based on these reception beam signals may be calculated based on a distance from the transducer 2 to a reflection target which can be obtained based on a period of time from the transmission to the reception of the transmission wave, and a direction of the reception beam signal.

The filtering module 15 may perform a bandlimiting filtering or a pulse compression filtering to the reception beam signal formed by the beam forming module 14. The reception beam signal processed by the filtering module 15 may be a signal acquired from each position included in a 3D area Z1, and may have a 3D position from which each signal is acquired, and an echo intensity of the signal, as echo image information.

The image data generation module 16 may generate the 3D data indicative of a distribution of underwater target objects around the ship based on the amplitude of the reception beam signal filtered by the filtering module 15 (in detail, an absolute value of the complex signal). In detail, the image data generation module 16 may generate the 3D data based on the signal acquired from the 3D area Z1. Then, the image data generation module 16 may generate 3D (i.e., 3 dimensional) image data D3 which specifies a 3D image IM3 and a side image IM4 of the echo by projecting the 3D data on a two-dimensional (2D) plane.

As described above, the image data generation module 16 may generate the 3D image data D3 which expresses the position and the echo intensity of the underwater target object as the echo image, and may contain color information based on at least the reception signal generated by each ultrasonic transducer (each receiving element) 2a. Moreover, in order to generate the 3D image data D3, the image data generation module 16 expresses, for example, a set of echoes at which the echo intensity is the same, by an isosurface. That is, in the example of this embodiment, the image data generation module 16 may generate the 3D image data D3 by performing isosurface processing. Moreover, the image data generation module 16 may generate the 3D image data D3 based on the result of the beam forming performed by the beam forming module 14 to the reception signal generated by each ultrasonic transducer 2a.

Figure 4:
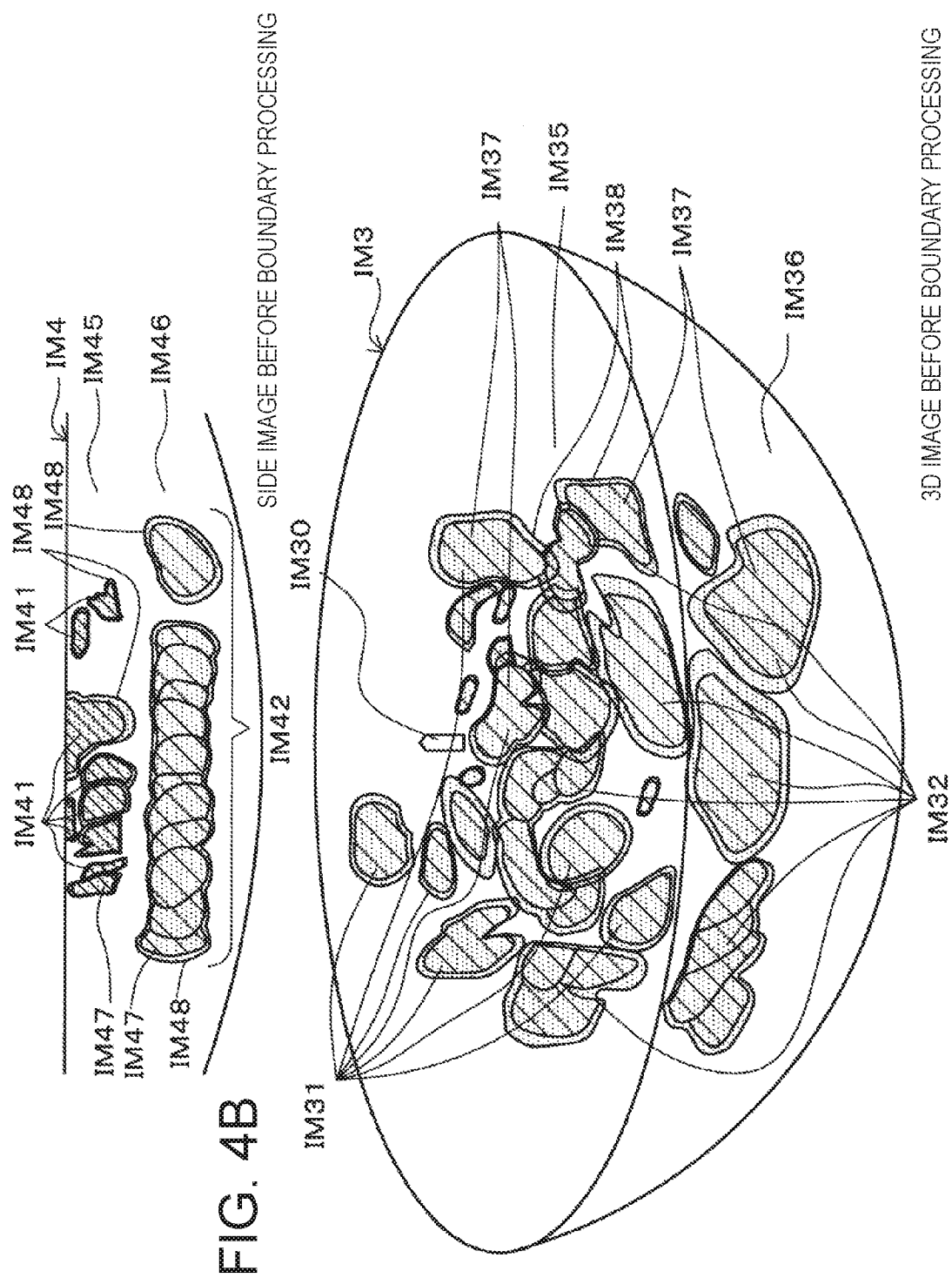
FIG. 4A is a view schematically illustrating a 3D image specified by 3D image data generated by an image data generation module, where a state before boundary processing is performed is illustrated.
FIG. 4B is a side image which is an image of the 3D image seen horizontally from one side, where a state before the boundary processing is performed is illustrated.

FIG. 4A is a view schematically illustrating the 3D image IM3 of the echo specified by the 3D image data D3 generated by the image data generation module 16, where a state before a boundary processing is performed is illustrated. FIG. 4B is a side image IM4 which is an image of the 3D image IM3 of the echo, seen horizontally from one side, where a state before the boundary processing is performed is illustrated. Referring to FIGS. 1 to 4, the 3D image data D3 generated by the image data generation module 16 may be outputted to the display unit 4. The display unit 4 may display an image specified by the given 3D image data D3 on a screen of the display unit 4.

For example, the 3D image IM3 and the side image IM4 of the 3D image IM3 may suitably be displayed on the display unit 4. The 3D image IM3 and the side image IM4 may be alternatively or selectively displayed, or may be displayed simultaneously. For example, when the 3D image IM3 and the side image IM4 are displayed simultaneously, the side image IM4 is displayed above the 3D image IM3. For example, when a user operates a mouse of the user interface 5 to instruct a drag of the 3D image IM3, the image data generation module 16 rotates the 3D image IM3 on the screen of the display unit 4.

The 3D image IM3 may express, as an image, a 3D space which spreads in the horizontal direction and the water depth direction from a ship position marker IM30. In the 3D image IM3, x-axis and y-axis extend in the horizontal direction, and z-axis extends in the water depth direction.

For sake of convenience of description, in the 3D image IM3, the echo image may be given two levels of darkness according to the echo intensity. In this embodiment, the echo image with the highest echo intensity is indicated by an oblique hatching, and the echo image with the second highest echo intensity is indicated by a dot hatching. Below, the echo image to which the oblique hatching is given may be referred to as a "high intensity echo image IM37," and the echo to which the dot hatching is given may be referred to as a "moderate intensity echo image IM38." Note that, in the actual display unit 4, the high intensity echo image IM37 is indicated in deep red, and the moderate intensity echo image IM38 is indicated in a transparent light blue (however, they may also be indicated in other colors).

In the 3D image IM3, the high intensity echo images IM37 and the moderate intensity echo images IM38 surrounding the perimeter of the high intensity echo images IM37 may exist in each of shallow areas IM35 corresponding to a comparatively shallow water depth WD and seabed depth areas IM36 corresponding to a seabed depth WD1. Thus, the moderate intensity echo images IM38 may exist outside the high intensity echo images IM37, and the moderate intensity echo images IM38 may be located so as to surround the high intensity echo images IM37. In the 3D image IM3 illustrated as one example in FIG. 4, a case where there are a larger number of high intensity echo images IM37 in the seabed depth area IM36 is illustrated, compared with the number of high intensity echo images IM37 in the shallow area IM35. In this embodiment, the high intensity echo image IM37 and the moderate intensity echo image IM38 in the shallow area IM35 may be school-of-fish echo images IM31 indicative of schools of fish T1, and the high intensity echo image IM37 and the moderate intensity echo image IM38 in the seabed depth area IM36 may be seabed echo images IM32 indicative of the seabed T2.

Similarly to the 3D image IM3, in the side image IM4, the high intensity echo images IM47 and the moderate intensity echo images IM48 surrounding the perimeter of the high intensity echo images IM47 may exist in each of shallow areas IM45 corresponding to the comparatively shallow water depth WD and the seabed depth areas IM46 corresponding to the seabed depth WD1. Thus, the moderate intensity echo images IM48 may exist outside the high intensity echo images IM47, and the moderate intensity echo images IM48 may be located so as to surround the high intensity echo images IM47. In the side image IM4 illustrated as one example in FIG. 4, there may be more high intensity echo images IM47 in the seabed depth area IM46 than the high intensity echo images IM47 in the shallow area IM45. In this embodiment, the high intensity echo image IM47 and the moderate intensity echo image IM48 in the shallow area IM45 may be school-of-fish echo images IM41, and the high intensity echo image IM47 and the moderate intensity echo image IM48 in the seabed depth area IM46 may be seabed echo images IM42.

In the 3D image IM3, the high intensity echo image IM37 and the moderate intensity echo image IM38 in the shallow area IM35, and the high intensity echo image IM37 and the moderate intensity echo image IM38 in the seabed depth area IM36 are indicated by similar echo intensities, and therefore, it may be difficult to distinguish one from another. Similarly, in the side image IM4, the high intensity echo image IM47 and the moderate intensity echo image IM48 in the shallow area IM45, and the high intensity echo image IM47 and the moderate intensity echo image IM48 in the seabed depth area IM46 are indicated by similar echo intensities, and therefore, it may be difficult to distinguish one from another. Therefore, in this embodiment, in order to facilitate the visual identification between the high intensity echo image IM37 and the moderate intensity echo image IM38 in the seabed depth area IM36, and the high intensity echo image IM37 and the moderate intensity echo image IM38 in an area other than the seabed depth area IM36, a boundary processing may be performed. This boundary processing may also include processing for facilitating the visual identification between the high intensity echo image IM47 and the moderate intensity echo image IM48 in the seabed depth area IM46, and the high intensity echo image IM47 and the moderate intensity echo image IM48 in the area other than the seabed depth area IM46.

FIG. 5A is a view schematically illustrating the 3D image IM3, where a state after the boundary processing is performed is illustrated, and FIG. 5B is the side image IM4, where a state after the boundary processing is performed is illustrated.

Referring to FIGS. 1 to 5, next, the boundary processing is described concretely. In this embodiment, the acquiring module 17 of the receiver 8 may be configured to acquire the seabed depth WD1 directly under the ship S (i.e., water depth data). Moreover, the boundary setting module 18 may set a boundary B1 which passes through a reference point P1 having a water depth WD substantially equal to the acquired seabed depth WD1, and form a given angle $\theta B1$ with the horizontal direction.

Next, the image data generation module 16 may process the 3D image data D3 so that the color information in the 3D image IM3 and the side image IM4 which are specified by the 3D image data D3 is at least based on positions of the underwater target objects T1 and T2 with respect to the boundary B1.

The seabed depth WD1 may refer to a distance between the surface (seabed surface) of the seabed T2 at the position directly under the ship S, and the ship S (sea surface). Strictly, since the transducer 2 is located at a given depth below the sea surface, a value obtained by subtracting the given depth from the seabed depth obtained from the fishfinder 31 which will be described later may be used as the seabed depth WD1. However, in this embodiment, in order to simplify the description, the seabed depth WD1 obtained from the fishfinder 31 may be used as the seabed depth WD1 in the underwater detection apparatus 1. In this embodiment, the acquiring module 17 may obtain the seabed depth WD1 from the fishfinder 31 as an external source of information, which is different from the reception signal from the transducer 2, or obtain the same by a manual input by the user operating the user interface 5.

For example, the user can look at the side image IM4 displayed on the display unit 4, and input the seabed depth WD1 through the user interface 5. When the acquiring module 17 obtains the seabed depth WD1 in response to the manual input by the user operating the user interface 5, the seabed depth WD1 directly under the ship S may be given from the user interface 5 to the image data generation module 16.

Next, a configuration of the image data generation module 16 obtaining the seabed depth WD1 from the fishfinder 31 is described.

Figure 6:
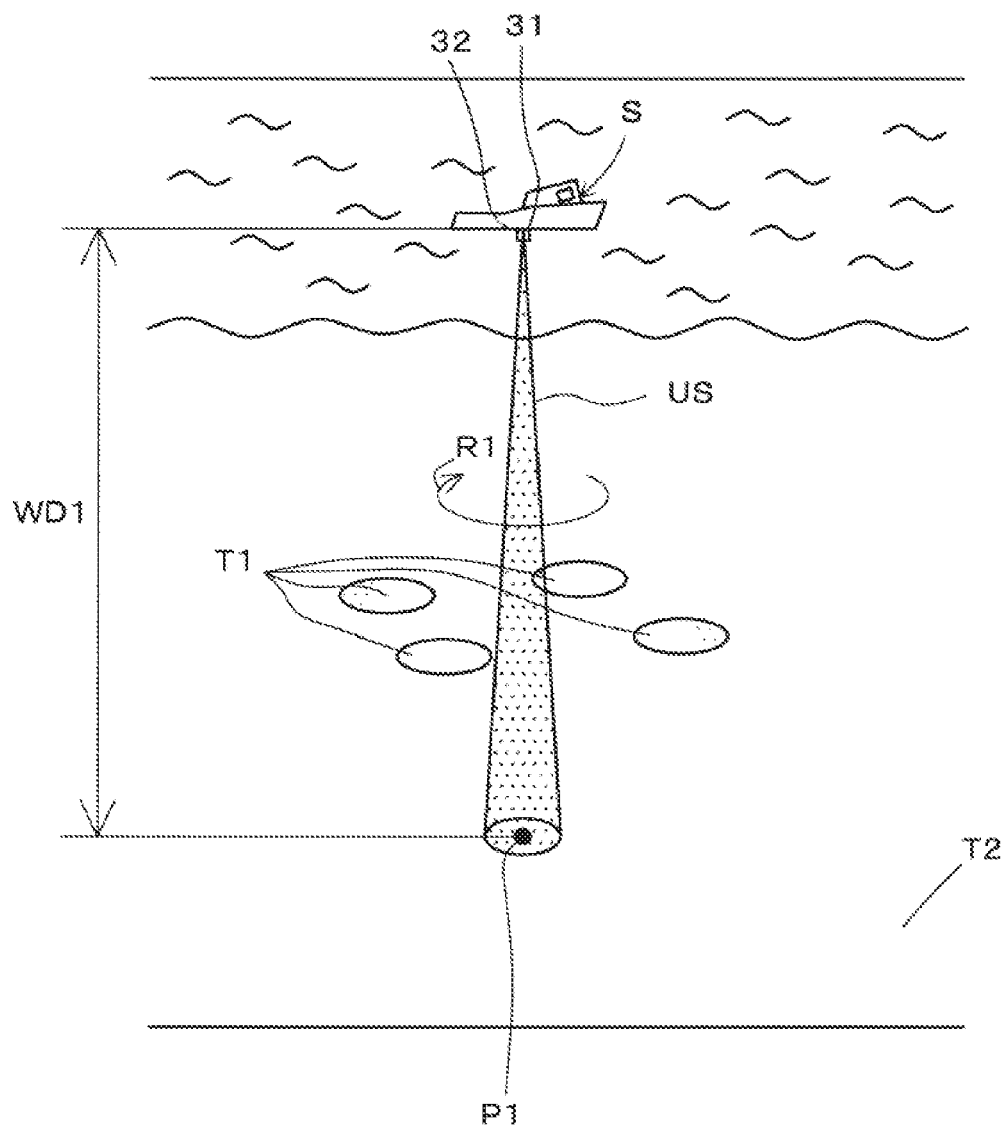
FIG. 6 is a view schematically illustrating a transmission wave transmitted from the transducer of a fishfinder.

FIG. 6 is a view schematically illustrating a transmission wave US transmitted from the transducer 32 of the fishfinder 31. Referring to FIG. 6, the fishfinder 31 may have a transducer 32 and a signal processor (not illustrated).

The transducer 32 may convert the electrical signal into the transmission wave US as the ultrasonic wave and transmit the transmission wave US underwater for every given timing (i.e., a given cycle), and convert the received ultrasonic wave into the electrical signal. The transducer 32 may transmit the ultrasonic wave directly below the ship S. For example, the ultrasonic wave is transmitted in the shape of a conical area.

The signal processor of the fishfinder 31 may process the reception wave received by the transducer 32 after the transmission of the transmission wave US to calculate the seabed depth WD1. For example, the signal processor may calculate a distance from a location where the echo intensity above a given value spreads uniformly in the horizontal direction to the ship S (transducer 32) as the seabed depth WD1. The signal processor of the fishfinder 31 may output the seabed depth WD1 to the boundary setting module 18.

Referring to FIGS. 1 to 5, the image data generation module 16 may perform the boundary processing when receiving an instruction for setting the color information based on the position of the underwater target object with respect to the boundary B1 from the user interface 5 by the user operating the user interface 5.

In the boundary processing, the boundary setting module 18 may first set the boundary B1. The boundary B1 may be a conical surface and may be a shape including a straight line.

The boundary B1 may form a given angle θB1 with the horizontal direction. This angle θB1 may be an oblique angle. The reason why the angle θB1 is set as described above is as follows. Even if the actual seabed T2 is flat, due to the resolution of the underwater detection apparatus 1, upper end positions of the seabed echo images IM32 and IM42 may be located upward the further the seabed T2 is positioned away from the position of the seabed T2 directly under the ship S.

Figure 5:
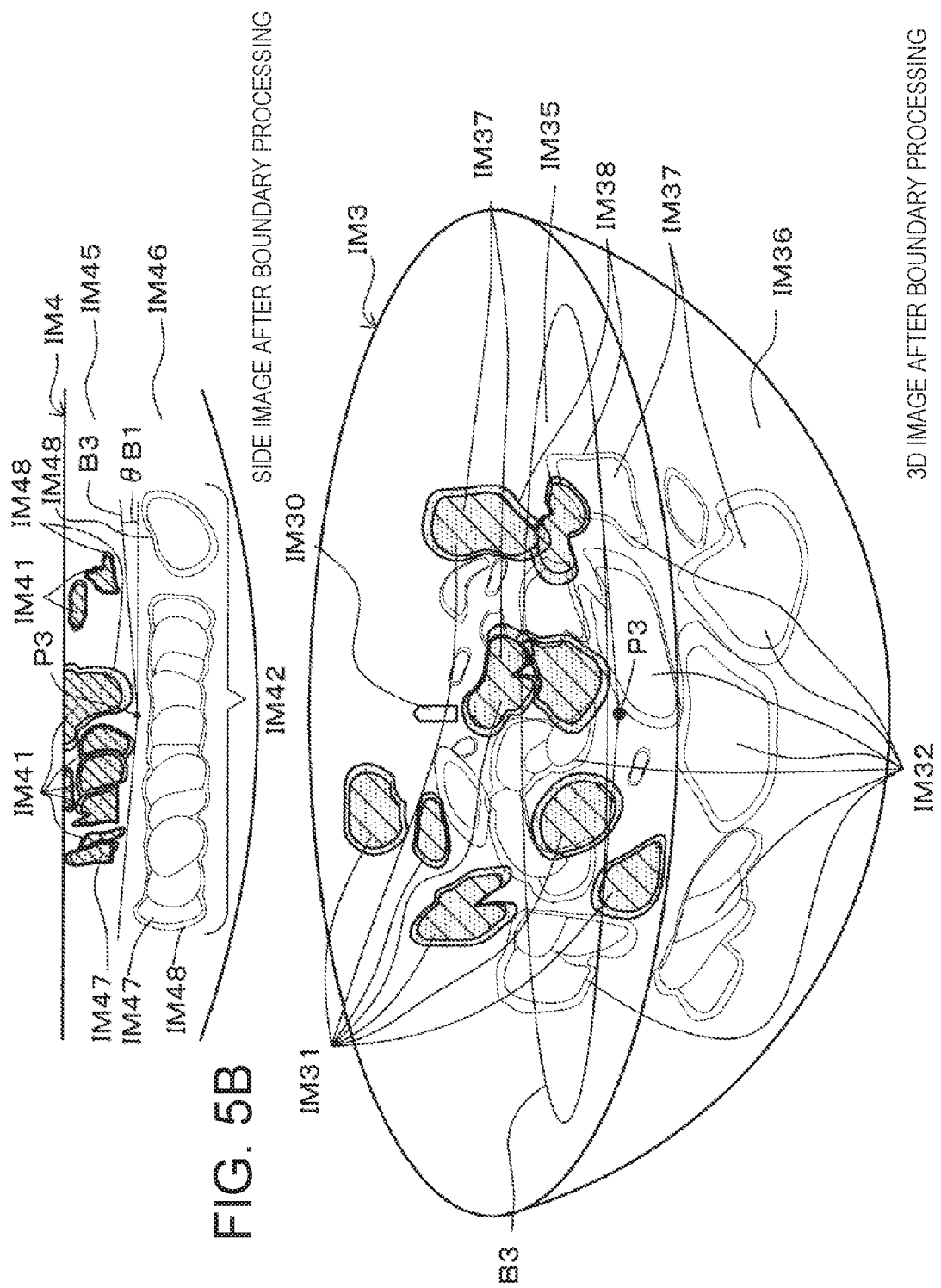
FIG. 5A is a view schematically illustrating the 3D image, where a state after the boundary processing is performed is illustrated.
FIG. 5B is a side image, where a state after the boundary processing is performed is illustrated.

As illustrated in FIG. 5, a reference point image P3 corresponding to the reference point P1 may be displayed on the 3D image IM3 and the side image IM4, and a boundary image B3 corresponding to the boundary B1 may be displayed. The boundary image B3 may be a boundary set in the 3D image IM3 and the side image IM4, may be displayed as the conical surface in the 3D image IM3, and may be displayed as a substantially V-shape including the straight line in the side image IM4. In the 3D image IM3 and the side image IM4, the boundary image B3 may form the given angle θB1 with the horizontal direction. Note that the boundary image B3 may not be displayed in the 3D image IM3 and the side image IM4.

The boundary setting module 18 may set the angle θB1 so that the boundary image B3 extends along the upper end position of the seabed echo image IM42. The boundary setting module 18 may set the angle θB1 based on a width of a reception beam formed in order to generate the reception signal of the reception wave corresponding to the transmission wave.

Note that the angle θB1 may be finely set or tuned by a manual input of an instruction by the user operating the user interface 5. When the angle θB1 is set by the user's manual input, it may be set by the user operating numerical key(s) of the user interface 5. Alternatively, the seabed depth WD1 may be tuned by a drag-and-drop operation of the reference point image P3 by a user's mouse operation, and the angle θB1 may be set by a drag-and-drop operation of the boundary image B3. Alternatively, a touch-panel function may be provided to the display unit 4, and the angle θB1 may be set by a user's finger operation while using the touch panel as the user interface 5. A change operation of the angle θB1 can be immediately reflected to the display contents of the display unit 4 by any of the input method according to the numerical key operation, the input method according to the drag-and-drop operation, and the input method of the touch panel type, thereby facilitating the adjustment work. Note that, also when the seabed depth WD1 is inputted by the user's manual input, the input using the touch-panel operation described above may also be performed.

The image data generation module 16 may set the color information of the seabed T2 as the underwater target object located at a depth deeper than the water depth WD of the boundary B1 independently from the color information of the school-of-fish T1 as the underwater target object located at the water depth WD shallower than the water depth WD of the boundary B1. Moreover, the image data generation module 16 may set the color information of the seabed T2 as the underwater target object which is located at a depth deeper than the water depth WD of the boundary B1 and of which the signal level of the reception signal is above a given threshold (for example, above the signal level of the moderate intensity echo image) independently from the signal level of the reception signal.

In this embodiment, the image data generation module 16 may set, in the 3D image IM3 and the side image IM4, the color of the echo images IM37, IM38, IM47, and IM48 located below the boundary image B3 (seabed echo images IM32 and IM42) as a different color from the color of the echo images IM37, IM38, IM47, and IM48 located above the boundary image B3 (school-of-fish echo images IM31 and IM41). For example, the image data generation module 16 may set the color of the echo images IM37, IM38, IM47, and IM48 located below the boundary image B3 (seabed echo images IM32 and IM42) as a monotone color, such as light gray. FIG. 5 illustrates, for convenience, that the image data generation module 16 changed the echo image IM37, IM38, IM47, and IM48 located below the boundary image B3 (seabed echo images IM32 and IM42) from the indication with hatching to the indication without hatching. Note that the seabed echo images IM32 and IM42 located below the boundary image B3 may be indicated with gradation.

The image data generation module 16, the acquiring module 17, and the boundary setting module 18 may perform the processing described above as the boundary processing, when the instruction for performing the boundary processing is received from the user interface 5. Then, the image data generation module 16 may generate boundary image data indicative of the position of the boundary image B3, and add this boundary image data to the 3D image data D3. At this time, the 3D image data D3 may include data indicative of the boundary image B3 in addition to the 3D image IM3 and the side image IM4.

Moreover, in this embodiment, the image data generation module 16 may generate the 3D image data D3 so that the 3D image IM3 and the side image IM4 are displayed in parallel to each other on the display unit 4. Note that the image data generation module 16 may generate the 3D image data D3 so that the 3D image IM3 and the side image IM4 are alternatively or selectively displayed on the display unit 4.

As well illustrated in FIG. 5, the 3D image IM3 and the side image IM4 to which boundary processing is performed make it easy to distinguish the school-of-fish echo images IM31 and IM41 from the corresponding seabed echo images IM32 and IM42. However, it may be desirable to enable the user to visually recognize more easily the water depth WD of the school-of-fish echo images IM31 and IM41, and a relative spatial relationship between the plurality of school-of-fish echo images IM31 and IM41.

Thus, in this embodiment, equi-depth contours (which may also be referred to as isodepth or isobath lines) L3 and L4 indicative of the water depth WD may be displayed on at least one of the 3D image IM3 and the side image IM4 before the boundary processing illustrated in FIG. 4, and the 3D image IM3 and the side image IM4 after the boundary processing illustrated in FIG. 5. The configuration for displaying the equi-depth contours L3 and L4 is described below. Below, although the indication of the equi-depth contours L3 and L4 in the 3D image IM3 and the side image IM4 after the boundary processing illustrated in FIG. 5 is described, the indication of the equi-depth contours L3 and L4 in the 3D image IM3 and the side image IM4 before the boundary processing illustrated in FIG. 4 may be similar.

FIG. 7A is a view schematically illustrating the 3D image IM3 after the boundary processing is performed, where the equi-depth contour L3 is further displayed, and FIG. 7B is the side image IM4 after the boundary processing is performed, where the equi-depth contour L4 is further displayed.

Figure 7:
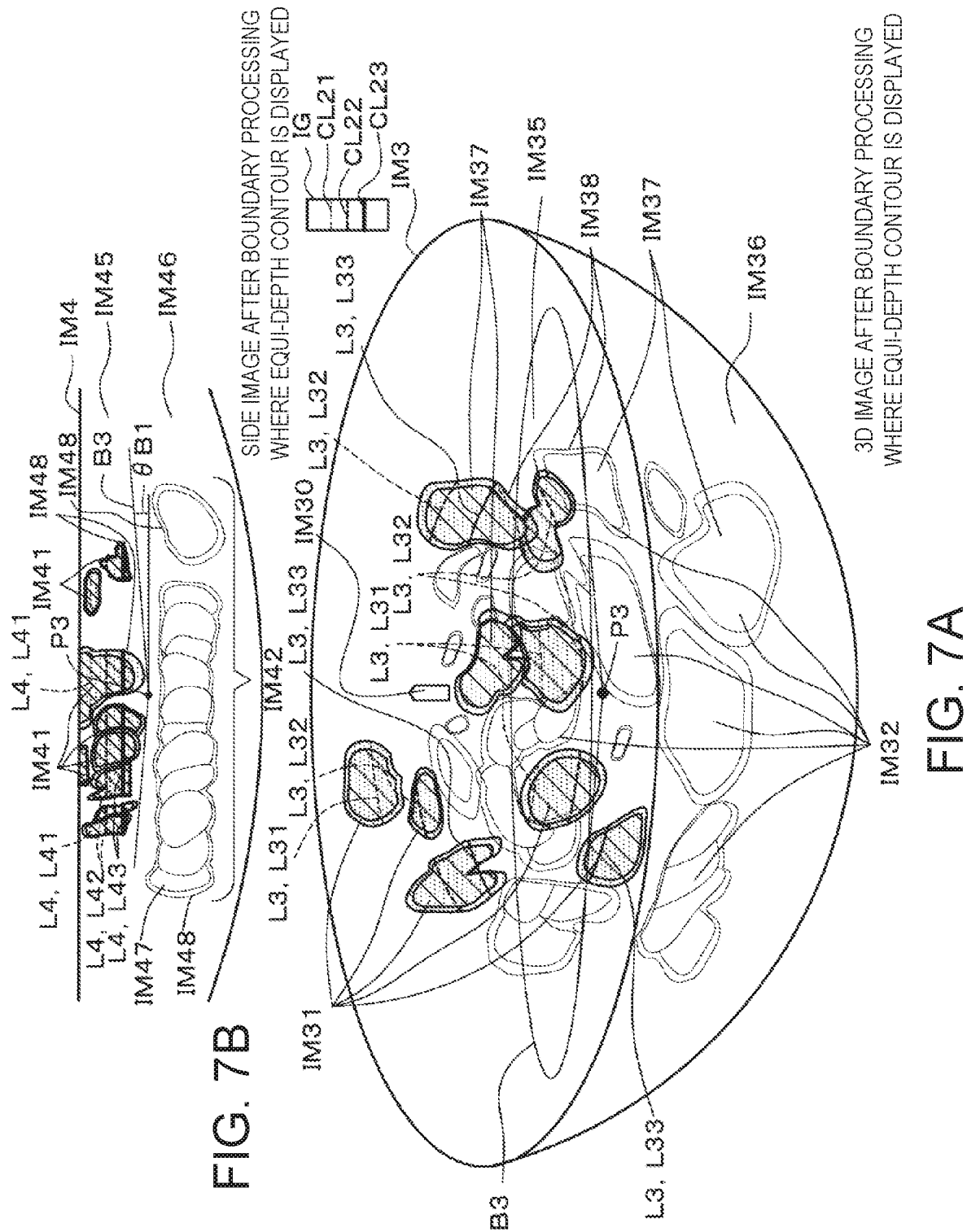
FIG. 7A is a view schematically illustrating the 3D image after the boundary processing is performed, where equi-depth contours are further displayed.
FIG. 7B is a side image after the boundary processing is performed, where equi-depth contours are further displayed.

Referring to FIGS. 2, 3, and 7, the depth indicating processing module 19 may add data to the 3D image data D3 for displaying the one or more equi-depth contours L3 (which may also be referred to as "marking" or "depth marking") on the 3D image IM3, and for displaying one or more equi-depth contours L4 (which may also be referred to as "marking" or "depth marking") on the side image IM4. That is, in this embodiment, the depth indicating processing module 19 may add the data of the equi-depth contours L3 and L4 to the 3D image data D3, as the markings indicative of the water depth WD.

In more detail, in this embodiment, the depth indicating processing module 19 may add the data of the equi-depth contours L3 and L4 as the marking indicative of the water depth WD to the 3D image data D3, by changing an echo intensity color CL1 indicative of the echo intensity of the 3D image data D3, of which the echo intensity indicated in the 3D image data D3 is above a given threshold Th, and of which the water depth WD indicated in the 3D image data D3 is equal to a given water depth WDx (x is a variable) into a depth color CL2, which is indicative of the water depth WD of the 3D image data D3 and which is a different color from the color of the echo intensity color CL1. By adding the markings to the 3D image data D3, the equi-depth contours L3 and L4 may be displayed in the 3D image IM3 and the side image IM4 of the 3D image IM3 specified by the 3D image data D3 to which markings are added. Note that, for example, the threshold Th used for the depth indicating processing module 19 may be a certain level of the reception signal received by the ultrasonic transducer 2a (e.g., a level of the echo intensity of the moderate intensity echo image IM38).

The depth indicating processing module 19 may receive an equi-depth contour display instruction which is, for example, given by the user operating the mouse provided to the user interface 5. For example, the equi-depth contour display instruction includes (a) an instruction of ON/OFF of the equi-depth contours L3 and L4 in the 3D image IM3 and the side image IM4, (b) an instruction of the numbers of equi-depth contours L3 and L4, (c) an instruction of the water depth positions of the equi-depth contours L3 and L4, (d) an instruction of an interval of the equi-depth contours L3 and an interval of the equi-depth contours L4, (e) an instruction of ON/OFF of an equi-depth plane indication in the 3D image IM3, and (f) an instruction of the water depth position of the equi-depth plane F3. As described above, the underwater detection apparatus 1 may be provided with the user interface 5 where the user performs operation for causing the depth indicating processing module 19 to receive the equi-depth contour display instruction. Thus, the underwater detection apparatus 1 may be provided with the user interface 5 which sets the given water depth WDx.

The ON/OFF instruction of the above (a) is given, for example, by the user pressing a given key of the keyboard provided to the user interface 5. The depth indicating processing module 19 which received the ON instruction from the user interface 5 may add the data of the equi-depth contours L3 and L4 as the markings indicative of the water depth WDx to the 3D image data D3. Thus, the depth indicating processing module 19 may process the 3D image data D3 so that, in the 3D image IM3 and the side image IM4, the state where the equi-depth contours L3 and L4 are not displayed is changed to the state where the equi-depth contours L3 and L4 are displayed. On the other hand, the depth indicating processing module 19 which received the OFF instruction from the user interface 5 may delete the data of the equi-depth contours L3 and L4 as the marking indicative of the water depth WDx from the 3D image data D3. Thus, the depth indicating processing module 19 may process the 3D image data D3 so that, in the 3D image IM3 and the side image IM4, the equi-depth contours L3 and L4 get deleted from the state where the equi-depth contours L3 and L4 are displayed.

The instruction of each of the numbers of the equi-depth contours L3 and L4 of the above (b) is given, for example, by the user pressing given key(s) in the keyboard of the user interface 5. The depth indicating processing module 19 which received the instruction of the numbers of equi-depth contours L3 and L4 from the user interface 5 may set the number of equi-depth contours L3 to be displayed on the 3D image IM3, and the number of equi-depth contours L4 to be displayed on the side image IM4. In FIGS. 7A and 7B, for example, the three equi-depth contours L3 (L31, L32, and L33) and the three equi-depth contours L4 (L41, L42, and L43) are displayed at equal intervals in the water depth direction (in the up-and-down direction in the 3D image IM3 and the side image IM4).

The instruction of the water depth positions of the equi-depth contours L3 and L4 of the above (c) is given, for example, by the user dragging and dropping one of the equi-depth contours L4 of the side image IM4 by using the mouse of the user interface 5. The depth indicating processing module 19 which received the drag-and-drop operation instruction from the user interface 5 may process the 3D image data D3 so that the water depth position(s) of only the equi-depth contours L4 for which the drag-and-drop operation is carried out, or all the equi-depth contours L4 is changed in real time. At this time, the depth indicating processing module 19 may process the 3D image data D3 so that the equi-depth contour L3 corresponding to the equi-depth contour L4 for which the drag-and-drop operation is carried out or all the equi-depth contours L3 is/are changed in the water depth position.

Note that the water depth positions of the equi-depth contours L3 and L4 may be set by the depth indicating processing module 19 so that they become positions passing through the centers of the shapes of the school-of-fish echo images IM31 and IM41.

The instruction of the interval of the equi-depth contours L3 and the interval of the equi-depth contours L4 of the above (d) is given, for example, by the user pressing the given key(s) in the keyboard of the user interface 5. The depth indicating processing module 19 which received the interval instruction from the user interface 5 may set an interval of the equi-depth contours L3 adjacent to each other in the water depth direction, and an interval of the equi-depth contours L4 adjacent to each other in the water depth direction.

Note that, when displaying each of the equi-depth contours L3 and L4 only at a single water depth WDx, the functions of the above (b) and (d) may be omitted.

The depth indicating processing module 19 may add the data of the equi-depth contours L3 and L4 (markings) to the 3D image data D3 so that the equi-depth contours L3 and L4 according to the equi-depth contour display instruction described above are displayed on the corresponding 3D image IM3 and side image IM4. The depth indicating processing module 19 may add the data of the equi-depth contours L3 and L4 (markings) indicative of the water depths WDx to the 3D image data D3 so that, among the school-of-fish echo image IM31 and IM41 which are located above the boundary image B3 and of which the echo intensities are above the echo intensities of the moderate intensity echo images IM38 and IM48, the equi-depth contours L3 and L4 indicative of the water depths WDx are displayed at locations equal to the water depths WDx given by the instruction of the above (c).

The depth indicating processing module 19 may add the data of equi-depth contours L3 and L4 to the 3D image data D3 so that, among the high intensity echo images IM37 and IM47 and the moderate intensity echo images IM38 and IM48 of the school-of-fish echo images IM31 and IM41 which are specified by the 3D image data D3, the equi-depth contours L3 and L4 are generated for the moderate intensity echo images IM38 and IM 48 having the given echo intensities. That is, the depth indicating processing module 19 may add the data of the equi-depth contours L3 and L4 to the 3D image data D3 as the markings when the echo intensity of the 3D image data D3 is the given echo intensity. Then, the depth indicating processing module 19 may add the data of the equi-depth contours L3 and L4 to the 3D image data D3 so that the equi-depth contours L3 and L4 are displayed for the moderate intensity echo images IM38 and IM48 having the echo intensities below the maximum echo intensities of the school-of-fish echo images IM31 and IM41. That is, the given echo intensity may be below the maximum echo intensity in the 3D image data D3. Note that, on the other hand, the depth indicating processing module 19 may not display the equi-depth contours L3 and L4 for the high intensity echo images IM37 and IM47 of the school-of-fish echo images IM31 and IM41.

In other words, the depth indicating processing module 19 may add the data of the equi-depth contour L3 to the 3D image data D3 so that, among the plurality of echo intensity portions IM37 and IM38 of a set of school-of-fish echo images IM31 specified by the 3D image data D3, the equi-depth contour L3 is generated for one echo intensity portion IM38. Further, the depth indicating processing module 19 may add the data of the equi-depth contour L4 to the 3D image data D3 so that, among the plurality of echo intensity portions IM47 and IM48 of a set of school-of-fish echo images IM41 specified by the 3D image data D3, the equi-depth contour L4 is generated for one echo intensity portion IM48. As described above, when there are a plurality of different echo intensity portions in the 3D image data D3, the depth indicating processing module 19 may add the data of the equi-depth contours L3 and L4 to only one of the plurality of different echo intensity portions, as the markings.

Figure 8:
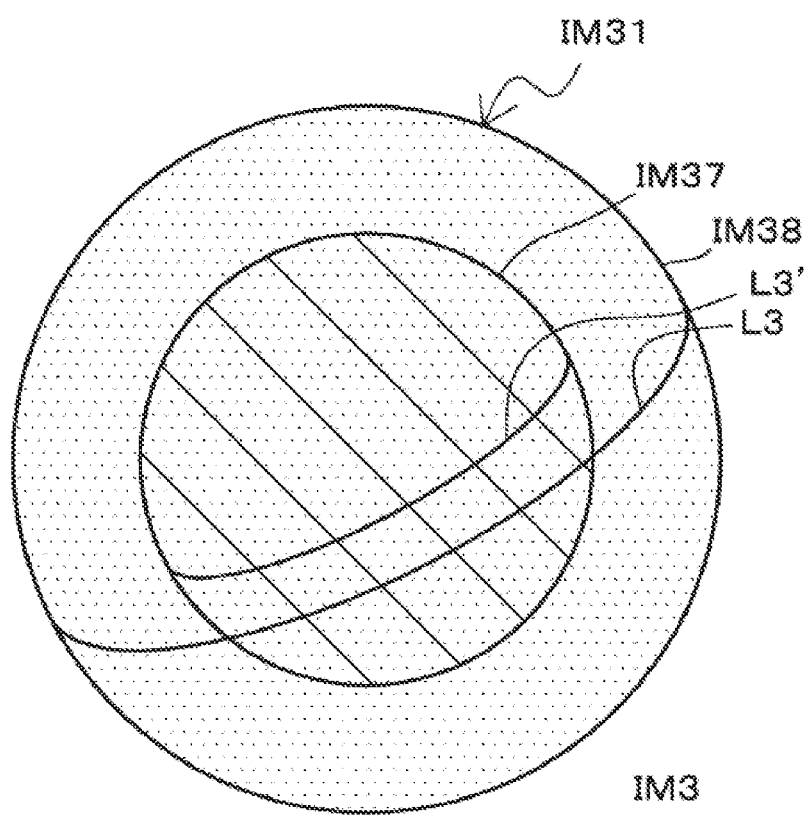
FIG. 8 is a view illustrating one example of the 3D image, where the equi-depth contour is added to each of a high intensity echo image and a moderate intensity echo image.

As illustrated in FIG. 8, if equi-depth contours L3' and L3 at the same water depth WD are added to the high intensity echo image IM37 and the moderate intensity echo image IM38, respectively, as a plurality of echo intensity portions of a set of school-of-fish echo images IM31 specified by the 3D image data D3, since the equi-depth contours L3' and L3 are adjacent to each other in the 3D image IM3, the equi-depth contours L3' and L3 may be displayed so as to be overlapped with each other, and therefore, it may turn out to be more difficult for the user to visually grasp the water depth WD of the school-of-fish echo image IM31. FIG. 8 is a view illustrating one example of the 3D image IM3, where the equi-depth contours L3' and L3 are added to the high intensity echo image IM37 and the moderate intensity echo image IM38, respectively.

Referring again to FIGS. 2, 3, and 7, in this embodiment, the data of equi-depth contours L3 and L4 may be added to the 3D image data D3 as the markings so that the equi-depth contours L3 and L4 are displayed at the outermost circumferential surfaces of the moderate intensity echo images IM 38 and IM48 of the school-of-fish echo image IM31 and IM41 specified by the 3D image data D3.

The depth indicating processing module 19 may change an echo intensity color CL1 indicating the echo intensity of the 3D image data D3 and used for indicating the echo intensity value of the moderate intensity echo images IM38 and IM48 to a depth color CL2 indicating the water depth WD of the 3D image data D3, used for indicating the water depth WD of the school-of-fish echo images IM31 and IM41, and different from the echo intensity color CL1 to add the data of the equi-depth contours L3 and L4 to the 3D image data D3 as the markings so that the equi-depth contours L3 and L4 are displayed for the moderate intensity echo images IM38 and IM48 of the school-of-fish echo images IM31 and IM41.

In this embodiment, the depth indicating processing module 19 may set the depth color CL2 according to the water depth WD of the 3D image data D3. In more detail, the depth indicating processing module 19 may set the depth color CL2 so as to be changed continuously or in a stepped fashion according to the water depth WD of the 3D image data D3 indicative of the water depth WD of the school-of-fish echo images IM31 and IM41. Moreover, in this embodiment, the depth indicating processing module 19 may add the data of the equi-depth contours L3 and L4 to the 3D image data D3 as the markings at a plurality of given water depths WDx (three water depths WDx in the example illustrated in FIG. 7). Therefore, at the plurality of given water depths WDx, the equi-depth contours L3 and L4 may be displayed for the moderate intensity echo images IM38 and IM48 of the school-of-fish echo images IM31 and IM41.

As described above, the echo intensity color CL1 of the moderate intensity echo images IM38 and IM48 may be translucent light blue, and is indicated by the dot hatching in the figure. On the other hand, the depth color CL2 of the plurality of equi-depth contours L3 and L4 in the 3D image IM3 and the side image IM4 are indicated, for example by, as a different color from the echo intensity color CL1, a depth color CL21 in orange (indicated by a thin dotted line in FIG. 7, which indicates the color of the equi-depth contours L31 and L41), a depth color CL22 in green (indicated by a thick dotted line in FIG. 7, which indicates the color of the equi-depth contours L32 and L42), and a depth color CL23 in blue (indicated by a thick solid line in FIG. 7, which indicates the color of the equi-depth contours L33 and L43), in this order. Note that, the colors illustrated above are only examples, and the depth color CL2 may be other colors, or an arbitrary combination of colors may be set by the user operating the user interface 5. The echo intensity color CL1 may similarly be other colors.

The depth indicating processing module 19 may add data of an indicator IG to the 3D image data D3 so that the indicator IG indicative of a relation between the color of the equi-depth contours L3 and L4 and the water depth WD is displayed in the 3D image IM3. The indicator IG may indicate that the water depth WD is deeper as it goes downward from the top.

As apparent from the above configuration, the depth indicating processing module 19 may add the data of the equi-depth contours L3 and L4 to the 3D image data D3 so that the equi-depth contours L3 and L4 are displayed for the school-of-fish echo images IM31 and IM41 at the water depth WDx. Therefore, in the 3D image IM3 and the side image IM4, the equi-depth contours L3 and L4 may not be displayed at a location where the echo image does not exist at the water depth WDx where the equi-depth contours L3 and L4 are displayed for the school-of-fish echo images IM31 and IM41.

Figure 9:
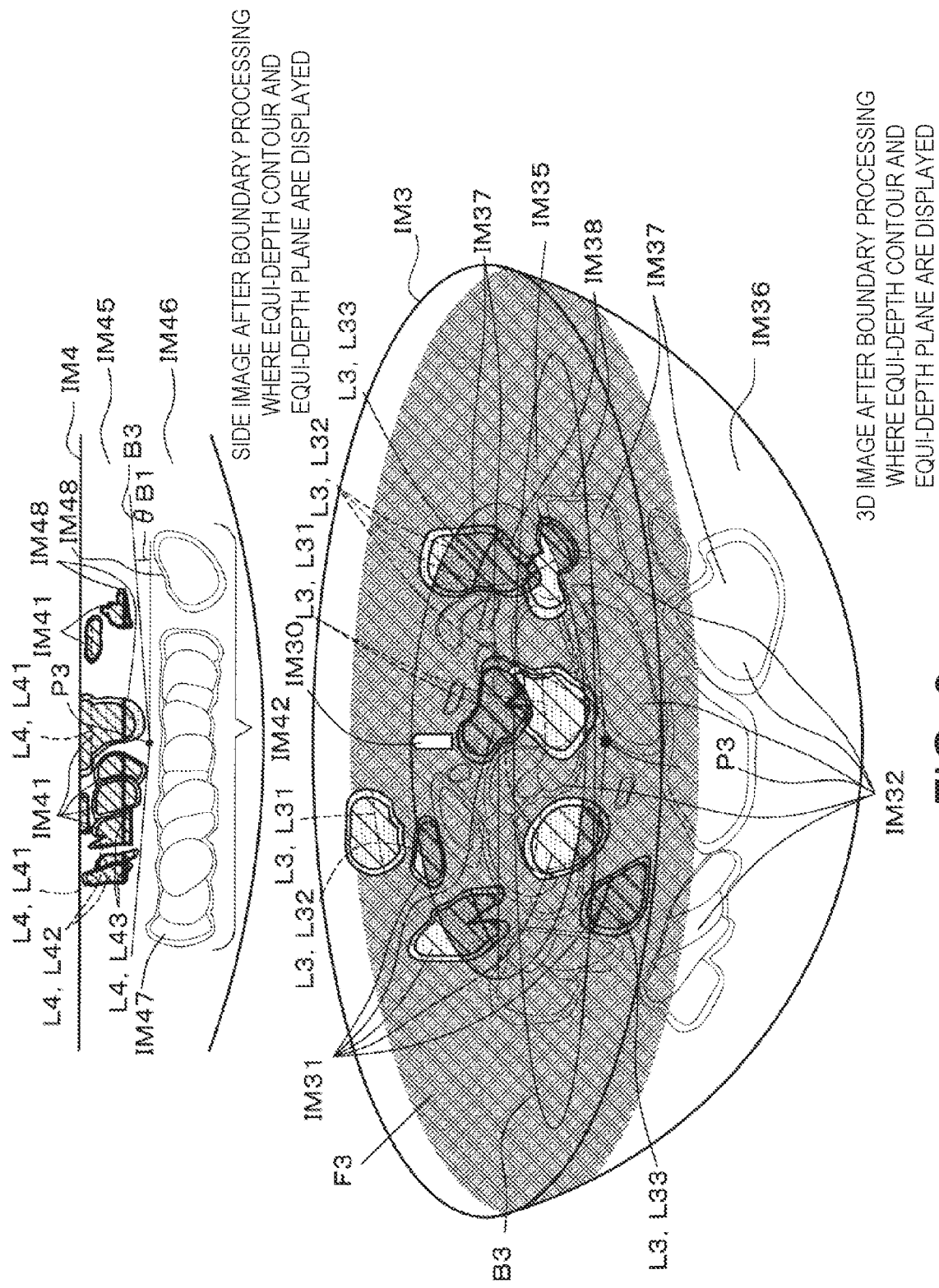
FIG. 9 is a view illustrating a state where the equi-depth plane is added to the 3D image illustrated in FIG. 7.

The above is a description about the equi-depth contours L3 and L4. Next, the equi-depth plane F3 (which may also be referred to as isodepth or isobath plane) is described. FIG. 9 is a view illustrating a state where the equi-depth plane F3 is added to the 3D image IM3 illustrated in FIG. 7.

Referring to FIGS. 3 and 9, the instruction of ON/OFF of the equi-depth plane indication in the 3D image IM3 of the above (e) is given, for example, by the user pressing the given key of the keyboard provided to the user interface 5. The depth indicating processing module 19 which received the ON instruction from the user interface 5 may add the equi-depth plane F3 as the markings (in detail, data of the equi-depth plane F3 for displaying the equi-depth plane F3 on the 3D image IM3) to the 3D image data D3 so that the equi-depth plane F3 is displayed in the 3D image IM3 from the state where the equi-depth plane F3 is not displayed. That is, in the state where the 3D image IM3 is displayed based on the 3D image data D3 to which the data of the equi-depth plane F3 is not added, the equi-depth plane F3 may not be displayed in the 3D image IM3, as illustrated in FIG. 7. From this state, when the depth indicating processing module 19 receives the ON instruction, the data of the equi-depth plane F3 may be added as the marking to the 3D image data D3. Then, the 3D image IM3 may be displayed based on the 3D image data D3 to which the data of the equi-depth plane F3 is added, and the equi-depth plane F3 may be displayed in the 3D image IM3, as illustrated in FIG. 9. On the other hand, the depth indicating processing module 19 which received the OFF instruction from the user interface 5 may delete the data of the equi-depth plane F3 from the 3D image data D3 in the 3D image IM3 so that the state where the equi-depth plane F3 is displayed becomes the state where the equi-depth plane F3 is not displayed. That is, in the state where the 3D image IM3 is displayed based on the 3D image data D3 to which the data of the equi-depth plane F3 is added, the equi-depth plane F3 may be displayed in the 3D image IM3, as illustrated in FIG. 9. From this state, when the depth indicating processing module 19 receives the OFF instruction, the data of the equi-depth plane F3 may be deleted from the 3D image data D3. Then, the 3D image IM3 may be displayed based on the 3D image data D3 to which the data of the equi-depth plane F3 is not added, and the equi-depth plane F3 may not be displayed in the 3D image IM3, as illustrated in FIG. 7.

The instruction of the water depth position of the equi-depth plane F3 of the above (f) is given, for example, by the user dragging and dropping the equi-depth plane F3 of the 3D image IM3 by using the mouse of the user interface 5. The depth indicating processing module 19 which received the drag-and-drop operation instruction from the user interface 5 may add the data of the equi-depth plane F3 (marking) to the 3D image data D3 so that the water depth position of the equi-depth plane F3 for which the drag-and-drop operation is carried out is changed in real time.

Thus, the depth indicating processing module 19 may add the data of the equi-depth plane F3 to the 3D image data D3 as the marking so that the equi-depth plane F3 is displayed at the water depth WDx specified in the 3D image IM3 in response to the reception of the ON instruction of the display of the equi-depth plane F3 from the user interface 5. The equi-depth plane F3 may be displayed as a translucent plane of an arbitrary color, such as blue. In the 3D image IM3 of FIG. 9, the equi-depth plane F3 is indicated by cross-hatching. In FIG. 9, the equi-depth plane F3 is displayed above the equi-depth contour L3 (L32) at the second water depth position. The school-of-fish echo image IM31 at the water depth WD shallower than the water depth WDx of the equi-depth plane F3 is displayed above the equi-depth plane F3. In FIG. 9, the school-of-fish echo image IM31 at the water depth WD shallower than the water depth WDx of the equi-depth plane F3 is displayed so as not to overlap with the cross-hatching. On the other hand, the school-of-fish echo image IM31 at the water depth WD deeper than the water depth WDx of the equi-depth plane F3 is displayed below the equi-depth plane F3. In FIG. 9, the school-of-fish echo image IM31 at the water depth WD deeper than the water depth WDx of the equi-depth plane F3 is displayed so as to overlap with the cross-hatching.

As apparent from the above configuration, the depth indicating processing module 19 may add the data of the equi-depth plane F3 to the 3D image data D3 as the marking indicative of the water depth WDx by changing the echo intensity color indicative of the echo intensity of the 3D image data D3 of which the water depth WD is equal to the given water depth WDx to the depth color which is a depth color indicative of the water depth WD of the 3D image data D3 and is different from this echo intensity color.

[Operation of Underwater Detection Apparatus]

Figure 10:
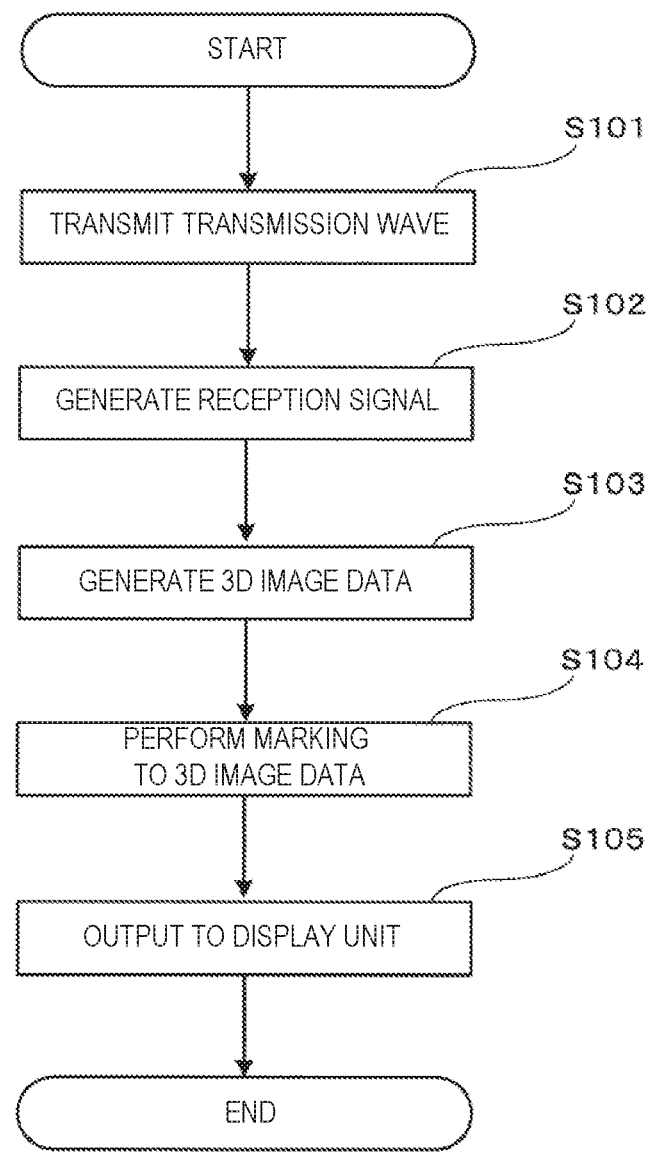
FIG. 10 is a flowchart illustrating operation of the underwater detection apparatus.

FIG. 10 is a flowchart illustrating one example operation of the underwater detection apparatus 1. In FIG. 10, the following operation is illustrated. The transmission wave may be transmitted underwater from the transducer 2, and the reception signal may be generated based on the reflection wave including the reflection of the transmission wave from the underwater target object. Further, the processing described above may be performed by the underwater detection apparatus 1, and the 3D image IM3 and its side image IM4 may be displayed on the display unit 4. After the 3D image IM3 and the side image IM4 are displayed on the display unit 4, the operation illustrated in the flowchart of FIG. 10 may again be performed when the transmission wave is transmitted underwater from the transducer 2. Note that, as illustrated in FIG. 10, the underwater detection method of this embodiment may be implemented by the operation of the underwater detection apparatus 1 being performed.

In the operation of the underwater detection apparatus 1, the transducer 2 may first transmit the transmission wave underwater (Step S101). The transmission wave transmitted underwater may be reflected on the underwater target object and may be received by the transducer 2. The transducer 2 may receive the reflection wave including the reflection of the transmission wave from the underwater target object by using the plurality of ultrasonic elements (receiving elements) 2a, and generate the reception signal based on the received reflection wave (Step S102).

When the reception signal is generated, the transducer 2 may output the generated reception signal to the receiver 8 of the transmission and reception device 3. The receiver may perform the processings described above by the analog part 11, the A/D converter 12, and the quadrature detecting module 13 to the reception signal, and may perform the beam forming by the beam forming module 14 to form the reception beam signal. Further, the receiver 8 may perform the processing described above by the filtering module 15 to the reception beam signal, and generate the 3D image data D3 based on the reception beam signal by the image data generation module 16, as described above (Step S103). That is, the image data generation module 16 may generate the 3D image data D3 indicating the position and the echo intensity of the underwater target object as the echo image, based on the reception signal generated at least by each ultrasonic transducer (each receiving element) 2a.

Moreover, in the receiver 8, when the processing to generate the 3D image data D3 by the image data generation module 16 is finished, the depth indicating processing module 19 may then perform the addition of the marking indicative of the water depth WDx to the 3D image data D3, as described above (Step S104). That is, the depth indicating processing module 19 may add the data of the equi-depth contours L3 and L4 to the 3D image data D3 as the markings indicative of the water depth WDx by changing the echo intensity color CL1 indicative of the echo intensity of the 3D image data D3 of which the water depth WD is equal to the given water depth WDx to the depth color CL2 which indicates the water depth WD of the 3D image data D3 and is different from the echo intensity color CL1.

When the depth indicating processing module 19 adds the markings to the 3D image data D3 generated by the image data generation module 16, the 3D image data D3 to which the markings are added may be outputted to the display unit 4 (Step S105). As illustrated in FIG. 7 or FIG. 9, the images, such as the 3D image IM3 and its side image IM4, specified by the 3D image data D3 may be displayed on the screen of the display unit 4 based on the inputted 3D image data D3. Therefore, in the screen of the display unit 4, the equi-depth contours L3 and L4 may be displayed, in addition to the school-of-fish echo images IM31 and IM41. When the image, such as the 3D image IM3, specified by the 3D image data D3 is displayed on the display unit 4, the operation of the underwater detection apparatus 1 illustrated in FIG. 10 may once be finished. Once the operation of the underwater detection apparatus 1 illustrated in FIG. 10 is finished, the transmission wave may again be transmitted underwater from the transducer 2 to again start the operation illustrated in FIG. 10.

[Effects]

As described above, according to the underwater detection apparatus 1 and the underwater detection method of this embodiment, the depth indicating processing module 19 may add the data of the equi-depth contours L3 and L4 to the 3D image data D3 as the markings indicative of the water depth WDx by changing the echo intensity color CL1 indicative of the echo intensity of the 3D image data D3 of which the water depth WD is equal to the specified water depth WDx to the depth color CL2 which indicates the water depth WD of the 3D image data D3 and is different from the echo intensity color CL1. According to this configuration, in the 3D image IM3 and the side image IM4 of the echo which are specified by the 3D image data D3, the equi-depth contours L3 and L4 may be displayed at the locations where the school-of-fish echo images IM31 and IM41 indicative of the school of fish T1 as the underwater target object are located. Therefore, the user can visually grasp more easily the water depth WD of the school of fish T1 (underwater target object) indicated by the school-of-fish echo images IM31 and IM41 in the 3D image IM3 and the side image IM4 of the echo. As a result, the user's burden for rotating the 3D image IM3 on the screen of the display unit 4 in order to confirm the water depth WD of the school of fish T1 can be reduced. Therefore, according to this embodiment, it is possible to realize the underwater detection apparatus 1 and the underwater detection method suitable for the fishing boat which performs fishing by particularly referring to the 3D image IM3. Moreover, according to this embodiment, the equi-depth contours L3 and L4 can be displayed on the 3D image IM3 and the side image IM4 by the simple processing of changing a part of the color data of the school-of-fish echo images IM31 and IM41.

Moreover, according to the underwater detection apparatus 1, the depth indicating processing module 19 may add the data of the equi-depth contours L3 and L4 (markings) to the 3D image data D3 so that the equi-depth contours L3 and L4 are displayed for the moderate intensity echo images IM38 and IM48 of which the echo intensities are relatively low among the school-of-fish echo images IM31 and IM41 specified by the 3D image data D3. According to this configuration, since the equi-depth contours L3 and L4 are displayed in the outward areas of the school-of-fish echo images IM31 and IM41, the user can visually recognize the equi-depth contours L3 and L4 more clearly. Moreover, the equi-depth contours L3 and L4 may be displayed only for the moderate intensity echo images IM38 and IM48 among the moderate intensity echo images IM38 and IM48 and the high intensity echo images IM37 and IM47 of the school-of-fish echo images IM31 and IM41. Therefore, the 3D image IM3 and the side image IM4 of the echo can be displayed, while hardly hiding the echo information, such as the echo intensities of the school-of-fish echo images IM31 and IM41.

Moreover, according to the underwater detection apparatus 1, the water depth WDx of the equi-depth contours L3 and L4 may be adjusted by the user operating the user interface 5. According to this configuration, for indicating the water depth WD of the school-of-fish echo images IM31 and IM41 of the user's interest, the equi-depth contours L3 and L4 can be set at any water depth position.

Moreover, according to the underwater detection apparatus 1, the depth indicating processing module 19 may set the depth color CL2 according to the water depth WD of the 3D image data D3 indicative of the water depth WD of the school-of-fish echo images IM31 and IM41. According to this configuration, the user can visually grasp the water depth WD of the school-of-fish echo images IM31 and IM41 more easily.

Moreover, according to the underwater detection apparatus 1, the depth indicating processing module 19 may add the data of the equi-depth contours L3 and L4 (markings) to the 3D image data D3 at a plurality of given water depths WDx. According to this configuration, the user can visually recognize the height of the school-of-fish echo images IM31 and IM41 in the water depth direction more clearly. Moreover, the user can grasp the relative position of the plurality of schools of fish T1 indicated by the plurality of school-of-fish echo images IM31 and IM41 more accurately.

Moreover, according to the underwater detection apparatus 1, the depth indicating processing module 19 may add the data of the equi-depth plane F3 to the 3D image data D3, and therefore, the equi-depth plane F3 is displayed in the 3D image IM3. According to this configuration, in the 3D image IM3, the user can visually recognize more easily whether the plurality of school-of-fish echo images IM31 is above or below the equi-depth plane F3.

[Modifications]

The present disclosure is not limited to the above embodiment, and various changes are possible within the scope of the appended claims. For example, the following configurations may be adopted.

Figure 11:
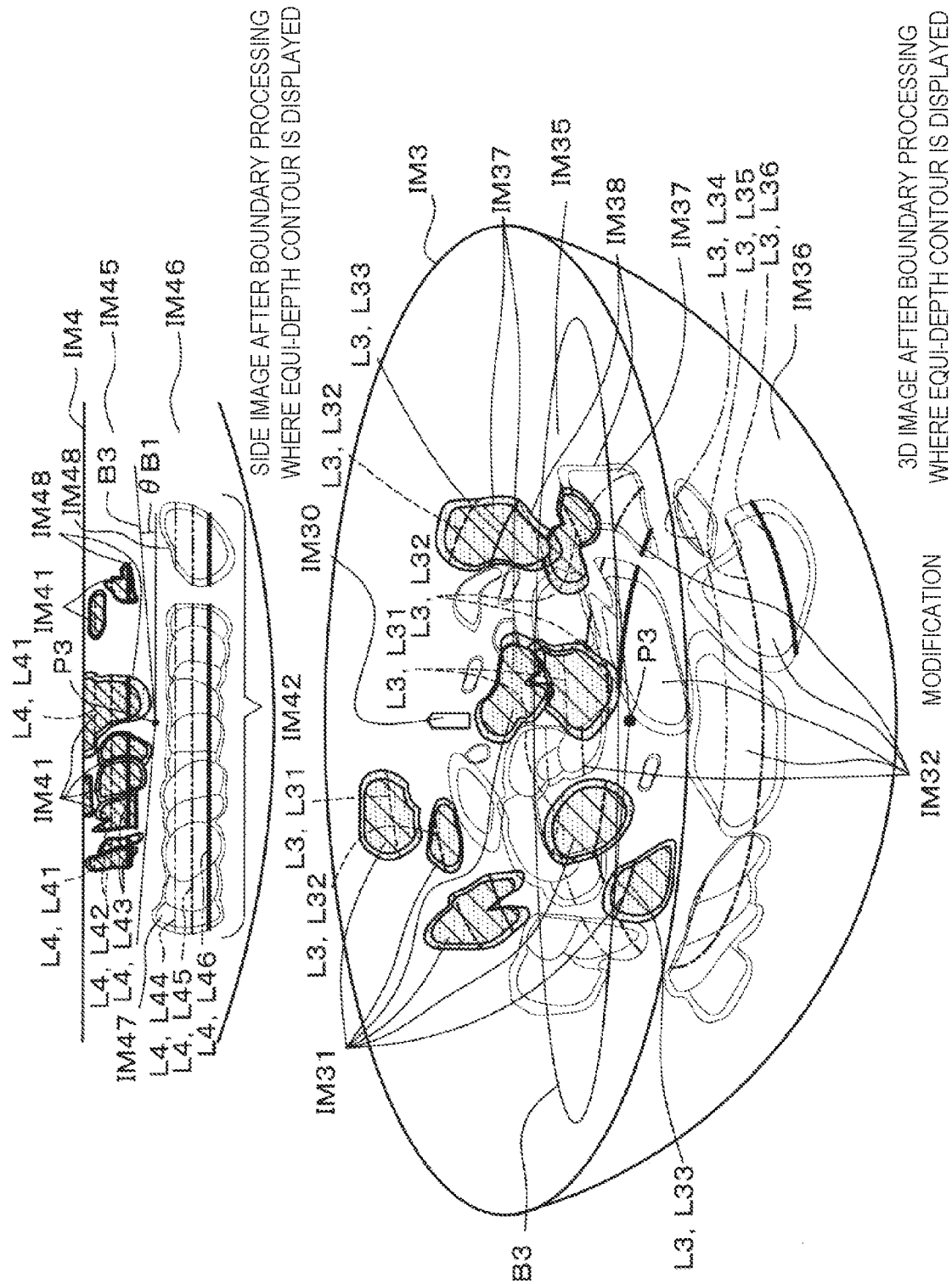
FIG. 11 is a view illustrating a modification of the 3D image and the side image after the boundary processing.

(1) In the above embodiment, the equi-depth contours L3 and L4 are not displayed for the seabed echo images IM32 and IM42 below the boundary image B3. However, it may be configured in a different way. As illustrated in FIG. 11 which illustrates a modification of the 3D image IM3 and the side image IM4 after the boundary processing, the equi-depth contours L3 (L34, L35, and L36) and L4 (L44, L45, and L46) may be displayed for the seabed echo images IM32 and IM42 as the echo images located below the boundary image B3. In this case, it may be desirable that the color of the equi-depth contours L3 and L4 added to the seabed echo images IM32 and IM42 below the boundary image B3 is set differently from the color of the equi-depth contours L3 and L4 of the school-of-fish echo images IM31 and IM41 above the boundary image B3.

(2) Moreover, in the above embodiment, the equi-depth plane F3 is displayed in the horizontal coordinates of the 3D image IM3. However, it may be configured in a different way. For example, the depth indicating processing module 19 may add data of a vertical plane to the 3D image data D3 so that the vertical plane extending in the water depth direction is displayed in the 3D image IM3. In this case, the vertical plane may become a plane extending in an azimuth direction R1 (illustrated in FIG. 2) from the ship position. Both the vertical plane and the equi-depth plane F3 may be displayed in the 3D image IM3, or one of them may be displayed selectively.

(3) Moreover, in the above embodiment, the data of the equi-depth contours L3 and L4 and the data of the equi-depth plane F3 are described as the examples of the marking. However, it may be configured in a different way. Instead of the data of the equi-depth contours L3 and L4 and the data of the equi-depth plane F3, data of images having given shapes may be used as the markings.

(4) Moreover, in the above embodiment, the image data generation module 16 generates the 3D image data D3 by performing the isosurface processing. However, it may be configured in a different way. The image data generation module 16 may generate the 3D image data D3 by performing volume rendering processing, instead of the isosurface processing. When generating the 3D image data D3 by the volume rendering processing, the image data generation module 16 may use all the echo intensities and adjust the opacity according to echo intensities to generate the 3D data. Then, the image data generation module 16 may generate the 3D image data D3 which specifies the 3D image IM3 and the side image IM4 of the echo by projecting the 3D data of which the opacity is adjusted according to the echo intensities on the 2D plane. Thus, in the image data generation module 16, the volume rendering processing may be used instead of the isosurface processing.

(5) Moreover, in the above embodiment and modifications, when performing the boundary processing, the seabed echo images IM32 and IM42 below the boundary image B3 may be set as a color other than gray, or may be deleted from the corresponding 3D image IM3 and side image IM4.

Figure 12A:
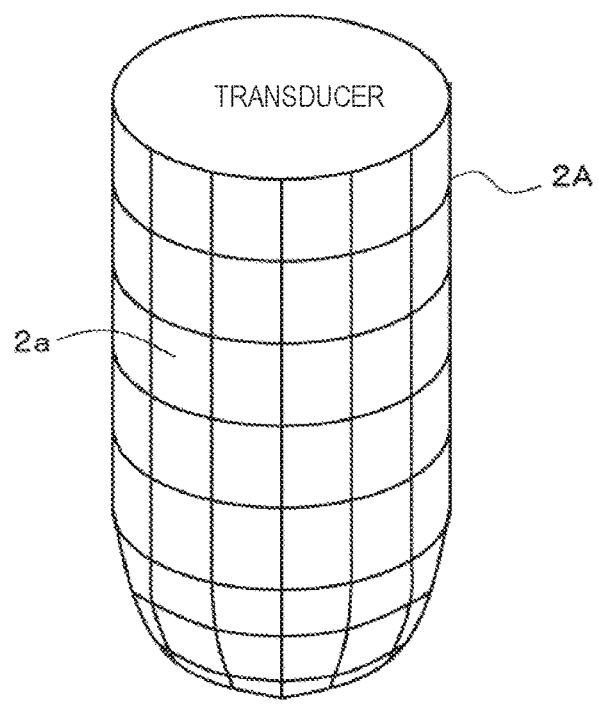
FIG. 12A is a view illustrating a modification of the transducer.
Figure 12B:
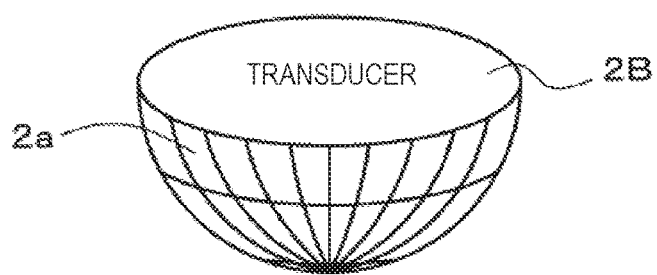
FIG. 12B is a view illustrating another modification of the transducer.
Figure 12C:
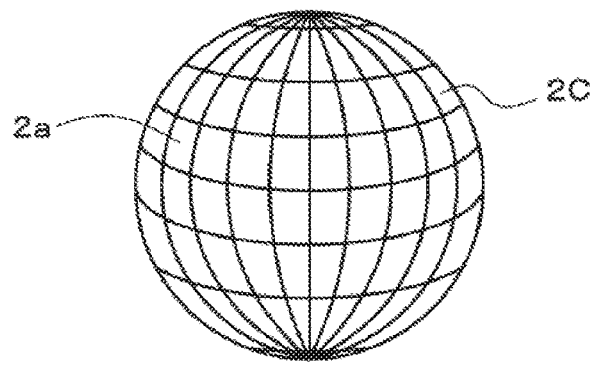
FIG. 12C is a view illustrating still another modification of the transducer.

(6) Moreover, in the above embodiment and modifications, the acquiring module 17 obtains the seabed depth WD1 from the fishfinder 31 or the user of the underwater detection apparatus 1. However, it may be configured in a different way. For example, instead of the transducer 2, a transducer 2A illustrated in FIG. 12A may be used, or a transducer 2B illustrated in FIG. 12B may be used, or a transducer 2C illustrated in FIG. 12C may be used.

The transducer 2A may have a casing which is formed in a substantially cylindrical shape and a lower part thereof is formed in a hemispherical shape. A plurality of ultrasonic transducers 2a may be attached to an outer circumferential surface and a hemispherical surface of the casing. The transducer 2B may have a casing formed in a hemispherical shape which is directed downwardly. The plurality of ultrasonic transducers 2a may be attached to a hemispherical surface of the casing. The transducer 2C may have a spherical casing. The plurality of ultrasonic transducers 2a may be attached to the entire surface of the casing. With such configurations, each of the transducers 2A-2C can output the transmission wave directly under the ship S. Therefore, the acquiring module 17 can measure the seabed depth WD1 based on the reception signal.

(7) Moreover, in the above embodiment and modifications, the scanning sonar in which the transducer 2 transmits and receives the signal in the stationary state with respect to the ship S is illustrated. However, it may be configured in a different way. For example, a movable transducer 2D illustrated in FIG. 13 may be used as the transducer.

The transducer 2D may include wave transmitting part 41 (which may also be referred to as a "transmission transducer"), a wave receiving part 42 (which may also be referred to as a "reception transducer"), a motor 43 which rotates the wave transmitting part 41 and the wave receiving part 42 as a rotary driving part, and a rotational angle detecting part 44.

Figure 13:
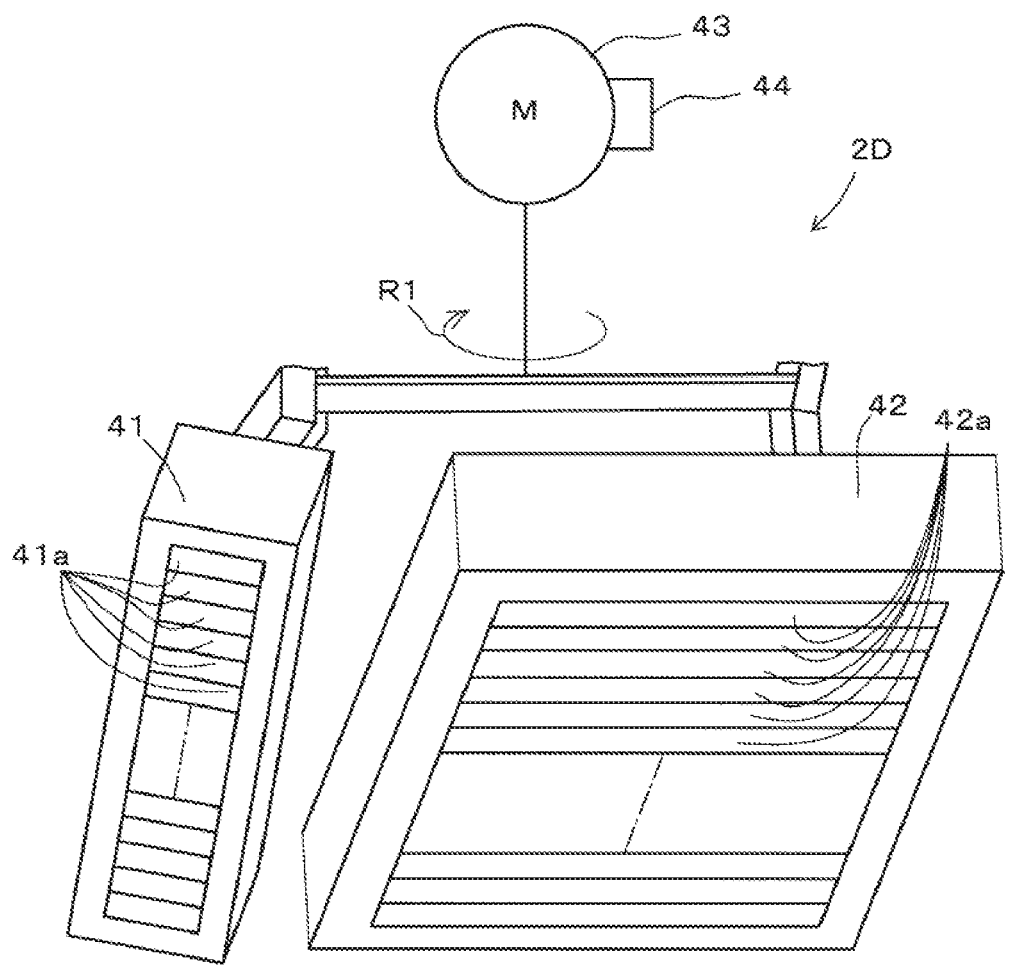
FIG. 13 is a view illustrating a substantial part of another modification of the present disclosure.
Figure 14:
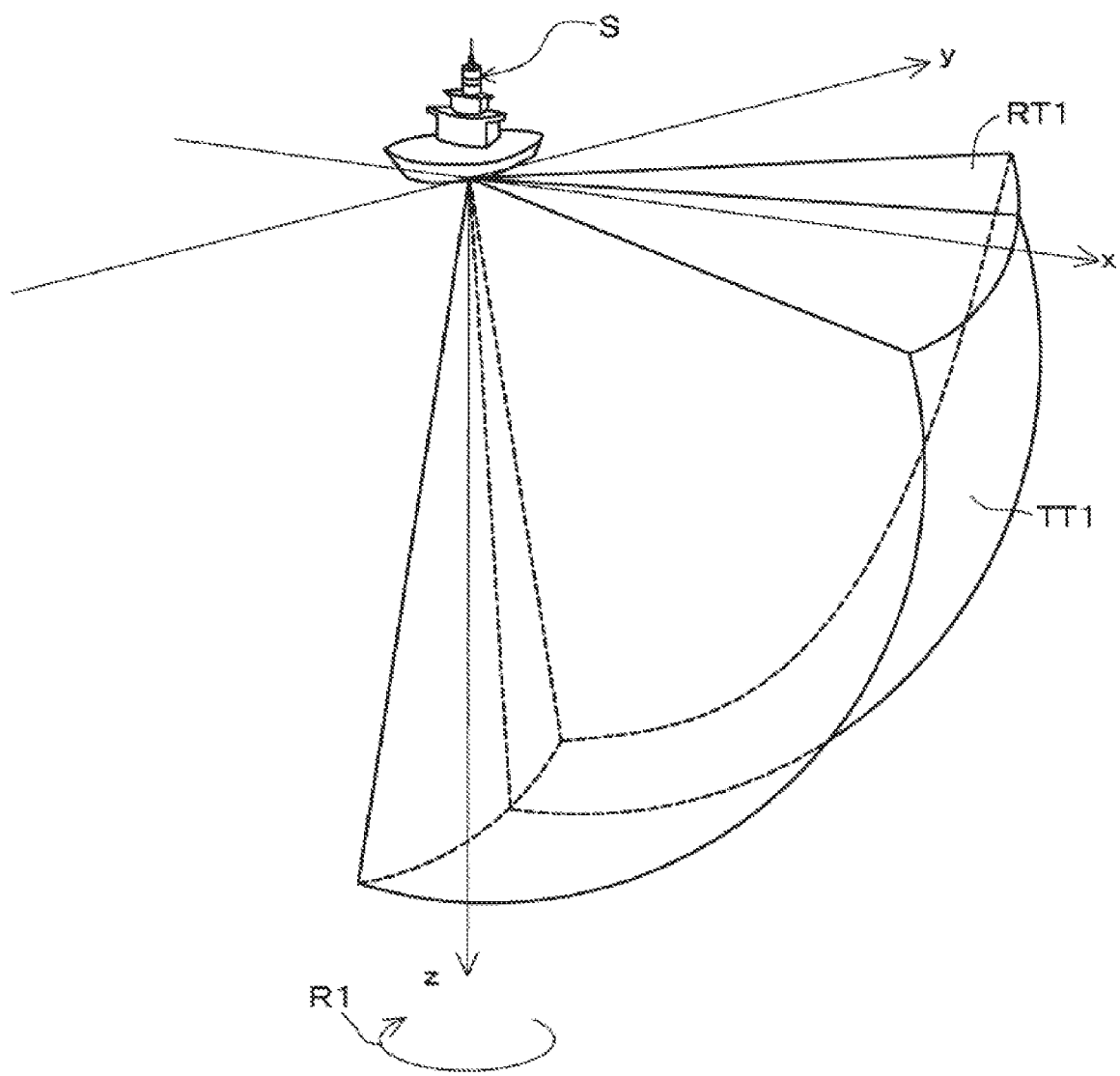
FIG. 14 is a view schematically illustrating a transmission beam and a reception beam which are formed by the transducer illustrated in FIG. 13.

FIG. 14 is a view schematically illustrating a transmission beam formed by the wave transmitting part 41, and a reception beam received by the wave receiving part 42. Referring to FIGS. 13 and 14, the wave transmitting part 41 may be provided in order to transmit the transmission wave underwater. The wave transmitting part 41 may have a configuration in which one or more wave transmitting elements 41a are attached to a casing as the ultrasonic transducer. In this embodiment, a plurality of wave transmitting elements 41a may be disposed linearly. That is, the wave transmitting part 41 may be a linear array.

The wave receiving part 42 may have a configuration in which one or more wave receiving elements (receiving elements) 42a are attached to the casing as the ultrasonic transducer. The wave receiving part 42 may receive the reflection wave of each transmission pulse wave which is an ultrasonic wave transmitted from the wave transmitting part 41 as the reception wave, and convert it into the echo signal as the electrical signal. In this embodiment, a plurality of wave receiving elements 42a may be disposed linearly. That is, the wave receiving part 42 may be a linear array.

The wave transmitting part 41 and the wave receiving part 42 may be integrally rotated by the motor 43. In this modification, the motor 43 may rotate the wave transmitting part 41 and the wave receiving part 42 in the azimuth direction R1 centering on a center axis extending in the up-and-down direction as a rotation axis.

The rotational angle detecting part 44 may be attached to the motor 43. In this modification, an angle position of the wave transmitting part 41 and the wave receiving part 42 may be calculated based on the rotational angle of the motor 43 detected by the rotational angle detecting part 44.

The wave transmitting part 41 may form a transmission fan-shaped area TT1 which is an area to which a 3D transmission beam is outputted, as illustrated in FIG. 14. The transmission fan-shape area TT1 may be a substantially fan-shaped, fan beam area.

The wave receiving part 42 may be configured to receive a signal of a reception fan-shaped area RT1 as a 3D reception beam area, as illustrated in FIG. 14. The Reception fan-shaped area RT1 may be substantially a fan shape.

The motor 43 may rotate the transmission fan-shaped area TT1 and the reception fan-shaped area RT1 on the rotation axis of the motor 43. In detail, the motor 43 may rotate the wave transmitting part 41 and the wave receiving part 42 by rotating the transmission fan-shaped area TT1 and the reception fan-shaped area RT1.

By rotating the wave transmitting part 41 and the wave receiving part 42 all around the rotation axis of the motor 43, i.e., by forming the transmission fan-shaped area TT1 and performing the signal reception operation in the reception fan-shaped area RT1, the reception signal required for the image data generation module 16 generating the 3D image data D3 may be acquired. That is, the transducer 2D may generate the reception signal required for generating the 3D image data D3 by the plurality of wave receiving elements (receiving elements) 42a. Then, the beam forming may be carried out to the acquired reception signal, and the image data generation module 16 may generate the 3D image data D3 based on the result of the beam forming.

The present disclosure is widely applicable to underwater detection apparatuses and underwater detection methods.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An underwater detection apparatus, comprising:
  a transmission transducer configured to transmit a transmission wave;
  a reception transducer comprising a plurality of reception elements configured to generate a reception signal based on a reflection wave comprising a reflection of the transmission wave on an underwater target, the underwater target being different from the seabed and at a depth shallower than the seabed; and
  processing circuitry configured to:
    generate a 3 dimensional image data that represents an echo intensity of the underwater target based at least in part on the reception signal generated by each reception element,
    set a depth marking on the 3 dimensional image data for which a depth is equal to a given depth and for which the echo intensity is above a given threshold, by changing an echo intensity color that represents the echo intensity of the 3 dimensional image data into a depth color that represents a depth of the 3 dimensional image data, the depth color being different from the echo intensity color, and
    control a display to display a 3 dimensional image based on the 3 dimensional image data with the depth marking set, such that the 3 dimensional image includes the echo intensity color and the depth color at a position on the 3 dimensional image representing the given depth.

2. The underwater detection apparatus of claim 1, wherein: the processing circuitry generates the 3 dimensional image data by performing isosurface processing.

3. The underwater detection apparatus of claim 2, wherein: the processing circuitry sets the marking on the 3 dimensional image data when the echo intensity of the 3 dimensional image data is a given echo intensity.

4. The underwater detection apparatus of claim 3, wherein: the given echo intensity is less than a maximum echo intensity of the 3 dimensional image data.

5. The underwater detection apparatus of claim 4, wherein: when the 3 dimensional image data represents a plurality of different echo intensity portions, the processing circuitry sets the marking on only one echo intensity portion of the plurality of different echo intensity portions.

6. The underwater detection apparatus of claim 1, wherein: the processing circuitry generates the 3 dimensional image data by performing volume rendering processing.

7. The underwater detection apparatus of claim 1, further comprising: a user interface configured to set the given depth.

8. The underwater detection apparatus of claim 1, wherein: the processing circuitry sets the depth color according to the depth of the 3 dimensional data.

9. The underwater detection apparatus of claim 1, wherein: the processing circuitry sets the marking at a plurality of given depth.

10. The underwater detection apparatus of claim 1, wherein: the processing circuitry sets an equi-depth plane on the 3 dimensional image data.

11. The underwater detection apparatus of claim 1, wherein: the processing circuitry generates the 3 dimensional image data by performing beamforming on the reception signal generated by each reception element.

12. An underwater detection method, comprising:
  transmitting a transmission wave;
  generating a reception signal based on a reflection wave comprising a reflection of the transmission wave on an underwater target, by using a plurality of reception elements, the underwater target being different from the seabed and at a depth shallower than the seabed;
  generating a 3 dimensional image data that represents an echo intensity of the underwater target based at least in part on the reception signal generated by each reception element;
  setting a depth marking on the 3 dimensional image data for which a depth is equal to a given depth and for which the echo intensity is above a given threshold, by changing an echo intensity color that represents the echo intensity of the 3 dimensional image data into a depth color that represents a depth of the 3 dimensional image data, the depth color being different from the echo intensity color; and
  controlling a display to display a 3 dimensional image based on the 3 dimensional image data with the depth marking set, such that the 3 dimensional image includes the echo intensity color and the depth color at a position on the 3 dimensional image representing the given depth.

13. The underwater detection apparatus of claim 1, wherein: the underwater target is a school of fish.

14. The method of claim 12, wherein: the underwater target is a school of fish.

\* \* \* \* \*